United States Patent
Ozkan et al.

(10) Patent No.: US 7,049,579 B2
(45) Date of Patent: May 23, 2006

(54) MANIPULATION OF LIVE CELLS AND INORGANIC OBJECTS WITH OPTICAL MICRO BEAM ARRAYS

(75) Inventors: Mihrimah Ozkan, Riverside, CA (US); Sadik Esener, La Jolla, CA (US); Mark Wang, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 690 days.

(21) Appl. No.: 09/917,139

(22) Filed: Jul. 26, 2001

(65) Prior Publication Data

US 2003/0193984 A1 Oct. 16, 2003

Related U.S. Application Data

(60) Provisional application No. 60/222,463, filed on Jul. 26, 2000.

(51) Int. Cl.
*H01S 3/081* (2006.01)

(52) U.S. Cl. .......................... 250/251; 250/216; 372/93
(58) Field of Classification Search ................. 250/251, 250/216; 372/93; 436/518; 359/566
See application file for complete search history.

(56) References Cited

U.S. PATENT DOCUMENTS

| 3,558,877 | A | 1/1971 | Pressman |
| 3,628,182 | A | 12/1971 | Ashkin et al. |
| 3,638,139 | A | 1/1972 | Ashkin et al. |
| 3,662,183 | A | 5/1972 | Ashkin et al. |
| 3,710,279 | A | 1/1973 | Ashkin |
| 3,725,810 | A | 4/1973 | Ashkin et al. |
| 3,761,721 | A | 9/1973 | Altshuler et al. |

(Continued)

FOREIGN PATENT DOCUMENTS

| DE | 4326181 | 2/1995 |
| EP | 0635994 | 9/1998 |
| EP | 0556748 | 10/1998 |
| EP | 0898493 | 1/2000 |
| JP | 03101419 | 4/1991 |
| JP | 05088107 | 4/1993 |
| JP | 05232398 | 9/1993 |

(Continued)

OTHER PUBLICATIONS

Wang, et al., "Integration of optoelectronic array devices for cell transport and sorting", Optical Diagnostics of Living Cells IV, San Jose, California, USA, Jan. 24–25, 2001, vol. 4260, pp. 68–73, Proceedings of the SPIE—The International Society for Optical Engineering, 2001.

Ackerson et al, "Radiation Pressure As A Technique For Manipulating The Particle Order In Colloidal Suspensions", Faraday Discuss. Chem. Soc., 83, 1987, 309–316.

Afzal et al, "Optical Tweezers Using A Diode Laser", Rev. Sci. Instrum., 63, 4, Apr. 1992, 2157–2163.

Amato, "Optical Matter Emerges Under Laser", Science News, 136, 1989, 212.

Asher et al, "Crystalline Colloidal Bragg Diffraction Devices: The Basis For A New Generation Of Raman Instrumentation", Spectroscopy, 1, 12, 1986, 26–31.

(Continued)

*Primary Examiner*—John R. Lee
*Assistant Examiner*—Zia R. Hashmi
(74) *Attorney, Agent, or Firm*—Fish & Richardson P.C.

(57) ABSTRACT

One or more microbeams derived from a corresponding number of Vertical Cavity Surface Emitting Lasers (VCSELs) are used to manipulate and to transport inorganic and organic objects. The optical tweezing apparatus and method is compact size, and suitable to manipulate multiple objects in an array concurrently, and in parallel.

33 Claims, 13 Drawing Sheets

U.S. PATENT DOCUMENTS

| | | |
|---|---|---|
| 3,778,912 A | 12/1973 | Ashkin |
| 3,793,541 A | 2/1974 | Ashkin et al. |
| 3,808,432 A | 4/1974 | Ashkin |
| 3,808,550 A | 4/1974 | Ashkin |
| 4,063,106 A | 12/1977 | Ashkin et al. |
| 4,092,535 A | 5/1978 | Ashkin et al. |
| 4,127,329 A | 11/1978 | Chang et al. |
| 4,247,815 A | 1/1981 | Larson et al. |
| 4,253,846 A | 3/1981 | Smythe et al. |
| 4,327,288 A | 4/1982 | Ashkin et al. |
| 4,386,274 A | 5/1983 | Altshuler |
| 4,390,403 A | 6/1983 | Batchelder |
| 4,440,638 A | 4/1984 | Judy et al. |
| 4,451,412 A | 5/1984 | Loiseaux et al. |
| 4,453,805 A | 6/1984 | Ashkin et al. |
| 4,520,484 A | 5/1985 | Huignard et al. |
| 4,536,657 A | 8/1985 | Bruel |
| 4,627,689 A | 12/1986 | Asher |
| 4,632,517 A | 12/1986 | Asher |
| 4,756,427 A | 7/1988 | Göhde et al. |
| 4,827,125 A | 5/1989 | Goldstein |
| 4,886,360 A | 12/1989 | Finlan |
| 4,887,721 A | 12/1989 | Martin et al. |
| 4,893,886 A | 1/1990 | Ashkin |
| 4,908,112 A | 3/1990 | Pace |
| 5,029,791 A | 7/1991 | Ceccon et al. |
| 5,079,169 A | 1/1992 | Chu et al. |
| 5,100,627 A | 3/1992 | Buican et al. |
| 5,113,286 A | 5/1992 | Morrison |
| 5,121,400 A | 6/1992 | Verdiell et al. |
| 5,170,890 A | 12/1992 | Wilson et al. |
| 5,189,294 A | 2/1993 | Jackson et al. |
| 5,198,369 A | 3/1993 | Itoh et al. |
| 5,206,504 A | 4/1993 | Sridharan |
| 5,212,382 A | 5/1993 | Sasaki et al. |
| 5,245,466 A | 9/1993 | Burns et al. |
| 5,274,231 A | 12/1993 | Chu et al. |
| 5,283,417 A | 2/1994 | Misawa et al. |
| 5,308,976 A | 5/1994 | Misawa et al. |
| 5,327,515 A | 7/1994 | Anderson et al. |
| 5,337,324 A | 8/1994 | Ohtsu et al. |
| 5,338,930 A | 8/1994 | Chu et al. |
| 5,343,038 A | 8/1994 | Nishiwaki et al. |
| 5,355,252 A | 10/1994 | Haraguchi |
| 5,360,764 A | 11/1994 | Celotta et al. |
| 5,363,190 A | 11/1994 | Inaba et al. |
| 5,364,744 A | 11/1994 | Buican et al. |
| 5,374,566 A | 12/1994 | Iranmanesh |
| 5,445,011 A | 8/1995 | Ghislain et al. |
| 5,452,123 A | 9/1995 | Asher et al. |
| 5,473,471 A | 12/1995 | Yamagata et al. |
| 5,495,105 A | 2/1996 | Nishimura et al. |
| 5,512,745 A | 4/1996 | Finer et al. |
| 5,608,519 A | 3/1997 | Gourley et al. |
| 5,620,857 A | 4/1997 | Weetall et al. |
| 5,625,484 A | 4/1997 | Coutsomitros |
| 5,629,802 A | 5/1997 | Clark |
| 5,631,141 A | 5/1997 | Sonek et al. |
| 5,637,458 A | 6/1997 | Frankel et al. |
| 5,644,588 A | 7/1997 | Misawa |
| 5,653,859 A | 8/1997 | Parton et al. |
| 5,659,561 A | 8/1997 | Torruellas et al. |
| 5,674,743 A | 10/1997 | Ulmer |
| 5,689,109 A | 11/1997 | Schutze |
| 5,694,216 A | 12/1997 | Riza |
| 5,760,395 A | 6/1998 | Johnstone |
| 5,770,856 A | 6/1998 | Fillard et al. |
| 5,773,298 A | 6/1998 | Lynggaard et al. |
| 5,776,674 A | 7/1998 | Ulmer |
| 5,793,485 A | 8/1998 | Gourley |
| 5,795,457 A | 8/1998 | Pethig et al. |
| 5,804,436 A | 9/1998 | Okun et al. |
| 5,814,200 A | 9/1998 | Pethig et al. |
| 5,858,192 A | 1/1999 | Becker et al. |
| 5,888,370 A | 3/1999 | Becker et al. |
| 5,900,160 A | 5/1999 | Whitesides et al. |
| 5,919,646 A | 7/1999 | Okun et al. |
| 5,935,507 A | 8/1999 | Morito et al. |
| 5,939,716 A | 8/1999 | Neal |
| 5,942,443 A | 8/1999 | Parce et al. |
| 5,950,071 A | 9/1999 | Hammond et al. |
| 5,952,651 A | 9/1999 | Morito et al. |
| 5,953,166 A | 9/1999 | Shikano et al. |
| 5,956,106 A | 9/1999 | Petersen et al. |
| 5,993,630 A | 11/1999 | Becker et al. |
| 5,993,631 A | 11/1999 | Parton et al. |
| 5,993,632 A | 11/1999 | Becker et al. |
| 6,015,714 A | 1/2000 | Baldarelli et al. |
| 6,033,546 A | 3/2000 | Ramsey |
| 6,055,106 A | 4/2000 | Grier et al. |
| 6,067,859 A | 5/2000 | Käs et al. |
| 6,071,394 A | 6/2000 | Cheng et al. |
| 6,074,725 A | 6/2000 | Kennedy |
| 6,078,681 A | 6/2000 | Silver |
| 6,082,205 A | 7/2000 | Zborowski et al. |
| 6,088,097 A | 7/2000 | Uhl |
| 6,088,376 A | 7/2000 | O'Brien et al. |
| 6,096,509 A | 8/2000 | Okun et al. |
| 6,111,398 A | 8/2000 | Graham |
| 6,121,603 A | 9/2000 | Hang et al. |
| 6,139,831 A | 10/2000 | Shivashankar et al. |
| 6,142,025 A | 11/2000 | Zborowski et al. |
| 6,143,558 A | 11/2000 | Kopelman et al. |
| 6,149,789 A | 11/2000 | Benecke et al. |
| 6,159,749 A | 12/2000 | Liu |
| 6,197,176 B1 | 3/2001 | Pethig et al. |
| 6,208,815 B1 | 3/2001 | Seidel et al. |
| 6,215,134 B1 | 4/2001 | O'Brien et al. |
| 6,221,654 B1 | 4/2001 | Quake et al. |
| 6,224,732 B1 | 5/2001 | Imasaka et al. |
| 6,242,209 B1 | 6/2001 | Ransom et al. |
| 6,280,960 B1 | 8/2001 | Carr |
| 6,280,967 B1 | 8/2001 | Ransom et al. |
| 6,287,758 B1 | 9/2001 | Okun et al. |
| 6,287,776 B1 | 9/2001 | Hefti et al. |
| 6,287,832 B1 | 9/2001 | Becker et al. |
| 6,287,874 B1 | 9/2001 | Hefti |
| 6,294,063 B1 | 9/2001 | Becker et al. |
| 6,344,325 B1 | 2/2002 | Quake et al. |
| 6,399,397 B1 | 6/2002 | Zarling et al. |
| 6,399,936 B1 * | 6/2002 | Hang et al. ................. 250/216 |
| 6,488,895 B1 | 12/2002 | Kennedy |
| 6,509,085 B1 | 1/2003 | Kennedy |
| 6,514,722 B1 | 2/2003 | Palsson et al. |
| 6,624,940 B1 * | 9/2003 | Grier et al. ................. 359/566 |
| 2002/0005354 A1 | 1/2002 | Spence et al. |
| 2002/0045272 A1 | 4/2002 | McDevitt et al. |
| 2002/0058332 A1 | 5/2002 | Quake et al. |
| 2002/0094533 A1 | 7/2002 | Hess et al. |
| 2003/0032204 A1 * | 2/2003 | Walt et al. ................. 436/518 |
| 2003/0047676 A1 | 3/2003 | Grier et al. |

FOREIGN PATENT DOCUMENTS

| | | |
|---|---|---|
| JP | 06123886 | 5/1994 |
| JP | 06132000 | 5/1994 |
| JP | 08234110 | 9/1996 |
| JP | 09043434 | 2/1997 |
| JP | 10048102 | 2/1998 |
| JP | 10062332 | 3/1998 |
| JP | 11218691 | 8/1999 |
| WO | 94/08221 | 4/1994 |

| | | |
|---|---|---|
| WO | 97/21832 | 6/1997 |
| WO | 99/39190 | 8/1999 |
| WO | 99/61888 | 12/1999 |
| WO | 00/23825 | 4/2000 |
| WO | 00/45160 | 8/2000 |
| WO | 00/45170 | 8/2000 |
| WO | 00/45179 | 8/2000 |
| WO | 00/54882 | 9/2000 |
| WO | 01/05514 | 1/2001 |
| WO | 01/09606 | 2/2001 |
| WO | 01/11333 | 2/2001 |
| WO | 01/14870 | 3/2001 |
| WO | 01/20309 | 3/2001 |
| WO | 01/32930 | 5/2001 |
| WO | 01/40454 | 6/2001 |
| WO | 01/40769 | 6/2001 |
| WO | 01/44852 | 6/2001 |
| WO | 01/68110 | 9/2001 |
| WO | 02/22774 | 3/2002 |

OTHER PUBLICATIONS

Ashkin, "Acceleration & Trapping Of Particles by Radiation Pressure", Physical Review Letters, 24, 4, Jan. 26, 1970, 156–159.

Ashkin, "Trapping Of Atoms By Resonance Radiation Pressure", Physical Review Letters, 40, 12, Mar. 20, 1978, 729–732.

Ashkin, "Forces Of A Single Beam Gradient Laser Trap On A Dielectric Sphere In The Ray Optics Regime", Biophys.J., 61, Feb. 1992, 569–582.

Ashkin et al, "Force Generation Of Organelle Transport Measured In Vivo By An Infrared Laser Trap", Nature, 348, Nov. 22, 1990, 346–348.

Ashkin et al, "Internal Cell Manipulation Using Infrared Laser Traps", Proc. Natl. Acad. Sci. USA, 86, 20, Oct. 1989, 7914–7918.

Ashkin et al., "Optical Levitation By Radiation Pressure", Appl.Phys.Lett., 19, 8, Oct. 15, 1971, 283–285.

Ashkin, "Optical Trapping & Manipulation Of Neutral Particles Using Lasers", Proc.Natl.Acad.Sci.USA, 94, 10, May 13, 1997, 4853–4860.

AVIVA website printout, www.avivabio.com.

Bagnato et al, "Continuous Stopping & Trapping Of Neutral Atoms", Physical Review Letters, 58, 21, May 25, 1987, 2194–2197.

Becker et al, "Separation Of Human Breast Cancer Cells From Blood By Differential Dielectric Affinity", Proc. Natl. Acad. Sci. USA, 92, Jan. 1995, 860–864.

Berns et al, "Use Of A Laser Induced Optical Force Trap To Study Chromosome Movement On the Mitotic Spindle", Proc. Natl. Acad. Sci. USA, 86, 12, Jun. 1989, 4539–4543.

Berns et al, "Laser Microbeam As A Tool In Cell Biology: A Survey Of Cell Biology", International Review Of Cytology, 129, 1991, 1–44 (Academic Press: San Diego).

Biegelow et al, "Observation Of Channeling Of Atoms In The Three Dimensional Interference Pattern Of Optical Standing Waves", Physical Review Letters, 65, 1, Jul. 2, 1990, 29–32.

Block et al., "Compliance Of Bacterial Flagella Measurement Without Optical Tweezers", Nature, 338, 6215, Apr. 6, 1989, 514–518.

Block, "Optical Tweezers: A New Tool For Biophysics", Noninvasive Techniques In Cell Biology, chap 15, 1990, 375–402. (Wiley–Liss Inc.: New York).

Bronkhorst et al, "A New Method To Study Shape Recovery Of Red Blood Cells Using Multiple Optical Trapping", Biophys. J., 69, 5, Nov. 1995, 1666–1673.

Buican et al., "Automated Single Cell Manipulation & Sorting By Light Trapping", Applied Optics, 26, 24, Dec. 15, 1987, 5311–5316.

Burns et al, "Optical Binding", Physical Review Letters, 63, 12, Sep. 18, 1989, 1233–1236.

Burns et al., "Optical Matter: Crystallization & Binding In Intense Optical Fields", Science, 249, 4970, Aug. 17, 1990, 749–754.

Business Week, "Is There Anything A Laser Can't Do?", Business Week, Oct. 30, 1989, 157.

Bustamante, "Direct Observation & Manipulation Of Single DNA Molecules Using Fluorescence Microscopy", Annu. Rev. Biophys. Biophys. Chem., 20, 1991, 415–446.

Bustamante et al., "Towards A Molecular Description Of Pulsed Field Gel Electrophoresis", Trends In Biotechnology, 11, 1993, 23–30.

Bustamante et al., "Manipulation Of Single DNA Molecules & Measurement Of Their Persistence, Length & Charge Density Under A Fluorescence Microscope", Abst. Of the 19th Mtg. Of Annual Mtg. Of Amer. Soc. For Photobiology, 53, Jun. 22, 1991, 46S (Pergamon Press: Oxford).

Caldwell, "Field–Flow Fractionation", Analytical Chemistry, 60, 17, Sep. 1, 1988, 959–971.

Chiou et al., "Interferometric Optical Tweezers", Optics Communications, 133, Jan. 1, 1997, 7–10.

Chou et al, "A Microfabricated Device for Sizing & Sorting DNA Molecules", Proc. Natl. Acad. Sci. USA, 96, Jan. 1999, 11–13.

Chowdhury et al., "Laser Induced Freezing", Physical Review Letters, 55, 8, Aug. 19, 1985, 833–836.

Chowdhury et al., "All Optical Logic Gates Using Colloids", Microwave & Optical Technology Letters, 1, 5, Jul. 1988, 175–178.

Chowdhury et al., Exchange of Letters, Science, 252, May 24, 1991.

Chu et al., "Experimental Observation Of Optically Trapped Atoms", Physical Review Letters, 57, 3, Jul. 21, 1986, 314–317.

Clark et al., "Single Colloidal Crystals", Nature, 281, 5726, Sep. 6, 1979, 57–60.

Crocker et al., Microscopic Measurement Of The Pair Interaction Potential Of Charge Stabilized Colloid, Physical Review Letters, 73, 2, Jul. 11, 1994, 352–355.

Cromie, "Scientists Bind Matter With Light", Harvard University Gazette, Oct. 13, 1989, 1, 4–5.

Davies et al, "Optically Controlled Collisions Of Biological Objects", SPIE, 3260, Jan. 25–28, 1998, 15–22.

Dholakia et al, "Optical Tweezers: The Next Generation", Physics World, Oct. 2002, 31–35.

Dufresne et al, "Optical Tweezer Arrays & Optical Substrates Created With Diffractive Optics", Review Of Scientific Instruments, 69, 5, May 1998, 1974–1977.

Esener, Center For Chips With Heterogeneously Integrated Photonics (CHIPS), DARPA Opto Centers Kickoff, Nov. 8, 2000, Dana Point, CA.

Fallman et al., "Design For Fully Steerable Dual Trap Optical Tweezers", Applied Optics, 36, 10, Apr. 1, 1997, 2107–2113.

Fisher, "The Light That Binds", Popular Science, Jan. 1990, 24–25.

Flynn et al, "Parallel Transport Of Biological Cells Using Individually Addressable VCSEL Arrays As Optical Tweezers", Sensors & Actuators B, 87, 2002, 239–243.

Fournier et al., "Writting Diffractive Structures By Optical Trapping", SPIE, 2406, Feb. 6–8, 1995, 101–112.

Fu et al, "A Microfabricated Fluorescence Activated Cell Sorter", Nature Biotechnology, 17, Nov. 1999, 1109–1111.

Gascoyne, website printout, Dec. 1, 2000.

Gorre–Talini et al, "Sorting Of Brownian Particles By The Pulsed Application Of A Asymmetric Potential", Physical Review E, 56, 2, Aug. 1997, 2025–2034.

Grier, "New Age Crystals", Nature, 389, 6653, Oct. 23, 1997, 784–785.

Greulich et al, "The Light Microscope On Its Way From An Analytical To A Preparative Tool", Journal Of Microscopy, 167, Pt. 2, Aug. 1, 1992, 127–151.

Gurrieri et al, "Imaging Of Kinked Configurations Of DNA Molecules Undergoing Orthogonal Field Alternating Gel Electrophoresis By Fluorescence Microscope", Biochemistry, 29, 13, Apr. 3, 1990, 3396–3401.

Gurrieri et al. Trapping Of Megabase Sized DNA Molecules During Agarose Gel Electrophoresis, Proc. Natl. Acad. Sci. USA, 96, Jan. 1999, 453–458.

Holtz et al, "Polymerized Colloidal Crystal Hydrogel Films As Intelligent Chemical Sensing Materials", Nature, 389, Oct. 23, 1997, 829–832.

Houseal et al, "Imaging Of The Motions & Conformational Transitions Of Single DNA Molecules Using Fluorescence Microscopy", Biophys.J., 55, 324, Feb. 12–16, 1989, 373a.

Houseal et al., "Real Time Imaging Of Single DNA Molecules With Fluorescence Microscopy", Biophys.J., 56, Sep. 1989, 507–516.

Huber et al., "Isolation Of A Hyperthermophilic Archaeum Predicted By in situ RNA Analysis", Nature, 376, 6535, Jul. 6, 1995, 57–58.

Imasaka et al., "Optical Chromatography", Analytical Chemistry, 67, 11, Jun. 1, 1995, 1763–1765.

Inside R&D, "Matter Bound By Light", Inside R&D, 18, 43, Oct. 25, 1989, 2.

Kuo et al., "Optical Tweezers In Cell Biology", Trends In Cell Biology, 2, Apr. 1992, 116–118.

Lai, Determination Of Spring Constant Of Laser Trapped Particle By Self–Mining Interferometry, Proc. Of SPIE, 3921, 2000, 197–204.

Law, "Matter Rides On Ripples Of Light", New Scientist, 1691, Nov. 18, 1989, 1691.

Leger et al, "Coherent Laser Addition Using Binary Phase Gratings", Applied Optics, 26, 20, Oct. 15, 1987, 4391–4399.

Li, et al.; Transport, Manipulations, and Reaction of Biological Cells On–Chip Using Electrokinetic Effects; Apr. 15, 1997; Analytical Chemistry, vol. 69, No. 8, pp. 1564–1568.

Mammen et al, "Optically Controlled Collisions Of Biological Objects To Evaluate Potent Polyvalent Inhibitors Of Virus–Cell Adhesion", Chemistry & Biology, 3, 9, Sep. 1996, 757–763.

Mason et al, "Optical Measurements Of Frequency Dependent Linear Viscoelastic Moduli Of Complex Fluids", Physical Review Letters, 74, 7, Feb. 13, 1995, 1250–1253.

McClelland et al, "Low Frequency Peculiarities Of The Photorefractive Response In Sillenites", Optics Communications, 113, Jan. 1, 1995, 371–377.

Mihrimah et al.; Heterogeneous Integration through Electrokinetic Migration; Nov./Dec. 2001; IEEE Engineering in Medicine and Biology; pp. 144–151.

Misawa et al, "Spatial Pattern Formation, Size Selection, & Directional Flow Of Polymer Latex Particles By Laser Trapping Technique", Chemistry Letters, 3, Mar. 1991, 469–472.

Misawa et al, "Multibeam Laser Manipulation & Fixation Of Microparticles", Appl.Phys.Lett., 60, 3, Jan. 20, 1992, 310–312.

Mitchell et al, "A Practical Optical Trap For Manipulating & Isolating Bacterial from Complex Microbial Communities", Microb.Ecol., 25, 2, 1993, 113–119.

Murray et al, "Experimental Observation Of Two Stage Melting In A Classical Two Dimensional Screened Coulomb System", Physical Review Letters, 58, 12, Mar. 23, 1987, 1200–1203.

Murray et al, "Colloidal Crystals", American Scientist, 83, 3, May–Jun. 1995, 238–245.

Mycometrix, website printout, www.mycometrix.com, Dec. 1, 2000.

New York Times, "Atoms Bound Together By Light", New York Times, Oct. 31, 1989, C17.

Paterson et al, "Controlled Rotation Of Optically Trapped Microscopic Particles", Science, 292, May 4, 2001, 912–914.

Pritchard et al., "Light Traps Using Spontaneous Forces", Physical Review Letters, 57, 3, Jul. 21, 1986, 310–313.

Quake et al, "From Micro– to Nanofabrication With Soft Materials", Science, 290, Nov. 24, 2000, 1536–1540.

Raab et al, "Trapping Of Neutral Sodium Atoms With Radiation Pressure", Physical Review Letters, 59, 23, Dec. 7, 1987, 2631–2634.

Rogovin et al, "Bifurcation In Degenerate Four–Wave Mixing In Liquid Suspensions Of Microspheres", Physical Review Letters, 54, 20, May 20, 1985, 2222–2225.

Roosen, "A Theoretical & Experimental Study Of The Stable Equilibrium Positions Of Spheres Levitated By Two Horizontal Laser Beams", Optics Communications, 21, 1, Apr. 1977, 189–194.

Sasaki et al, "Laser Scanning Micromanipulation & Spatial Patterning Of Fine Particles", Japanese Journal Of Applied Physics, 31, 5B, May 1991, L907–L909.

Sasaki et al., "Optical Micromanipulation Of A Lasing Polymer Particle In Water", Japanese Journal Of Applied Physics, Pt. 2, 32, 8B, Aug. 15, 1993, L1144–L1147.

Sasaki et al, "Optical Trapping Of A Metal Particle & A Water Droplet By A Scanning Laser Beam", Appl. Phys. Lett., 60, 7, Feb. 17, 1992, 807–809.

Shikano et al, "Separation Of A Single Cell By Red–Laser Manipulation", Applied Physics Letters, 75, 17, Oct. 25, 1999, 2671–2673.

Smith et al, "Four Wave Mixing In An Artificial Kerr Medium", Optics Letters, 6, 6, Jun. 1981, 284–286.

Smith et al, "Direct Mechanical Measurements Of The Elasticity Of Single DNA Molecules By Using Magnetic Beads", Science, 258, 5085, Nov. 13, 1992, 1122–1126.

Smith et al, "Model & Computer Simulations Of The Motion Of DNA Molecules During Pulsed Field Gel Electrophoresis", Biochemistry, 30, 21, May 28, 1991, 5264–5274.

Sonek et al, "Micromanipulation & Physical Monitoring Of Cells Using Two–Photon Excited Fluorescence In CW Laser Tweezers", SPIE, 2678, Jan. 28–Feb. 1, 1996, 62–68.

Suzuki et al, "Hysteric Behavior & Irreversibility Of Polymer Gels By pH Change", J. Chem. Phys., 103, 11, Sep. 15, 1995, 4706–4710.

Suzuki et al., "Optical Switching In Polymer Gels", J. Appl. Phys., 80, 1, Jul. 1, 1996, 131–136.

Svoboda et al, "Biological Applications In Optical Forces", Annu .Rev. Biophys. Biomol. Struct., 23, 1994, 247–285.

Svoboda et al, Conformation & Elasticity Of The Isolated Red Blood Cell Membrane Skeleton, Biophys. J., 63, 3, Sep. 1, 1992, 784–793.

Swanson et al, "Diffractive Optical Elements For Use In Infrared Systems", Optical Engineering, 28, 6, Jun. 1989, 605–608.

Swanson, et al., A fully multiplexed CMOS biochip for DNA analysis; 2000; Sensors and Actuators B 64; pp. 22–30.

Takashima et al., "Dielectric Dispersion Of DNA", J. Mol. Biol., 7, 5, Nov. 1963, 455–467.

Thirunamachandran, "Intramolecular Interactions In The Presence of An Intense Radiation Field", Molecular Physics, 40, 2, 1980, 393–399.

Unger et al, "Monolithic Microfabricated Valves & Pumps By Multilayer Soft Lithography", Science, 288, Apr. 7, 2000, 113–116.

Vanblaaderen et al, "Template Directed Colloidal Crystallization", Nature, 385, 6614, Jan. 23, 1997, 321–324.

Visscher et al, "Construction Of Multiple Beam Optical Traps With Nanometer Resolution Position Screening", IEEE Jnl Of Selected Topics In Quantum Electronics, 2, 4, Dec. 1996, 1066–1075.

Wang et al, "Integration Of Optoelectronic Array Devices For Cell Transport & Sorting", Photonics West 2001, Jan. 20–26, 2001, San Jose, CA.

Weber et al, "Manipulation Of Cells, Organelles & Genomes By Laser Microbeam & Optical Trap", Intl. Rev. Of Cytology, 133, 1992, 1–41, (Academic Press: San Diego).

Wei et al, Laser Trapping Microscopy As A Diagnostic Technique For The Study Of Cellular Response & Laser–Cell Interactions, SPIE, 2983, Feb. 10–11, 1997, 22–28.

Westbrook et al, "Localization Of Atoms In A Three Dimensional Standing Wave", Physical Review Letters, 65, 1, Jul. 2, 1990, 33–36.

Wheeler, "Force Fields Of Laser Light Bind Molecules In A Remarkable Discovery At Harvard", The Chronicle Of Higher Education, Oct. 25, 1989, A4.

Wright et al, "Radiation Trapping Forces On Microspheres With Optical Tweezers", Appl. Phys. Lett., 63, 6, Aug. 9, 1993, 715–717.

Wuite et al, "An Integrated Laser Trap/Flow Control Video Microscope For The Study Of Single Biomolecules", Biophys. Jnl., 79, 2, Aug. 2000, 1155–1167.

Xiang et al, "A Combinatorial Approach To Materials Discovery", Science, 268, 5218, Jun. 23, 1995, 1738–1740.

Yablonovitch, "Inhibited Spontaneous Emission In Solid State Physics & Electronics", Physical Review Letters, 58, 20, May 18, 1987, 2059–2062.

Yablonovitch et al, "Photonic Band Structure: The Face Centered Cubic Face", Physical Review Letters, 63, 18, Oct. 30, 1989, 1950–1953.

Yuqiu, "Mechanical, Electrical, & Chemical Manipulation Of Single DNA Molecules", Nanotechnology, 3, 1992, 16–20.

Zahn et al, "Fluorimetric Multiparameter Cell Assay At The Single Cell Level Fabricated By Optical Tweezers", FEBS Letters, 443, 1999, 337–340.

Zeidler; Automated chromosome analysis; Aug. 1988; Nature, vol. 334, No. 6183; p. 635.

Ashkin, "Applications of Laser Radiation Pressure", *Science*, vol. 210, No. 4474, pp. 1081–1088, Dec. 5, 1980.

Ahkin et al., "Optical Trapping and Manipulation of Viruses and Bacteria", *Science*, vol. 235, pp. 1517–1520, Mar. 20, 1987.

Ashkin, et al., "Optical trapping and manipulation of single cells using infrared laser beams", *Nature*, vol. 330, No. 6150, pp. 769–773, Dec., 1987.

Sasaki, et al., "Pattern formation and flow control of fine particles by laser–scanning micromanipulation", *Optics Letters*, vol. 16, No. 19, pp. 1463–1465, Oct. 1, 1991.

Faucheux, et al., "Confined Brownian motion", *Physical Review*, vol. 49, No. 6, pp. 5158–5163, plus figure 1, Jun., 1994.

Ashkin, et al., "Observation of a single–beam gradient force optical trap for dielectric particles", *Optics Letters*, vol. 11, No. 4, pp. 288–290, May, 1986.

* cited by examiner

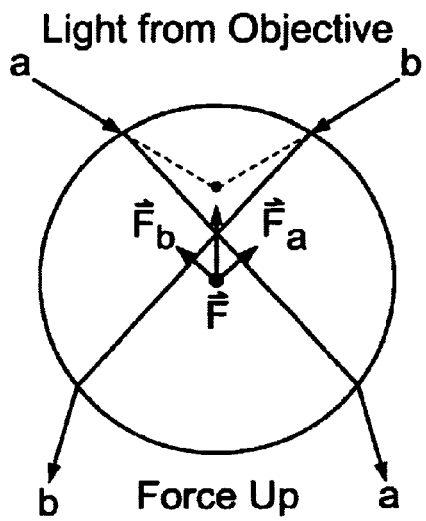
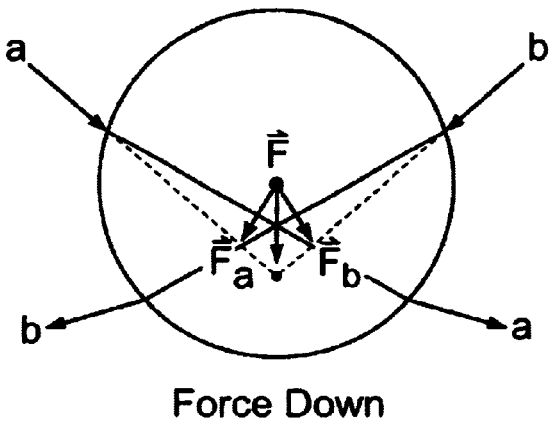
FIG. 2A
(Prior Art)
FIG. 2B
(Prior Art)
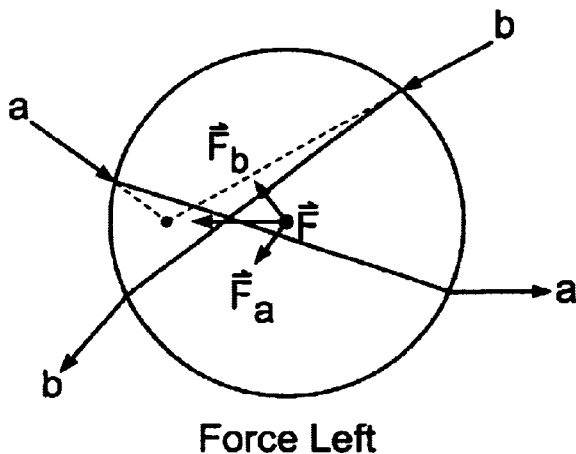
FIG. 2C
(Prior Art)

n = Index of Refraction
N.A. = Numerical Aperture
TIR = Total Internal Reflection

Measurement of Trapping Force on 10 μm Sphere as a Function of Driving Current

| Current (mA) | Power (mW) | Power at M.O. (mW) | Speed (μm/sec) | Force (pN) | Mode |
|---|---|---|---|---|---|
| 5.85 | 0.2 | Insufficient Power to Trap | | | |
| 8.5 | 1.58 | 1.33 | 3 | 0.28 | |
| 10 | 1.76 | 1.3 | 3.75 | 0.35 | |
| 14 | 3.52 | 2.68 | 6 | 0.57 | |
| 18 | 4.4 | 2.46 | 6.4 | 0.6 | |

FIG. 13

MANIPULATION OF LIVE CELLS AND INORGANIC OBJECTS WITH OPTICAL MICRO BEAM ARRAYS

RELATION TO A PROVISIONAL PATENT APPLICATION

The present patent application is descended from, and claims benefit of priority of, U.S. provisional patent application Ser. No. 60/222,463 filed on Jul. 26, 2000 for VCSEL, and VCSEL Arrays, for Optical Tweezing of Organic and Inorganic Objects to the selfsame inventors as the present utility patent application.

This invention was made by support of the U.S. Government under Grant No. MDA 972-98-1-001 to the Heterogeneous Optoelectronic Technology Center acting through the United States Defense Advanced Research Projects Agency (DARPA). The U.S. Government has certain rights in this invention.

BACKGROUND OF THE INVENTION

1. Field of the Invention

The present invention generally concerns optical traps and tweezers for, and optical trapping and tweezing of, small and microscopic objects.

The present invention particularly concerns (i) a laser and laser arrays for optical traps and tweezers, (ii) the structure and operation of optical traps and tweezers based on the laser and laser arrays, and (iii) the properties of output light from this (these) laser(s) and laser arrays.

2. Description of the Prior Art

Optical trapping generally enables transport of fine particles based on radiation pressure. Optical traps, or optical tweezers, act like the "tractor beams" of the fictional starship Enterprise on a microscopic scale. In 1985, A. Ashkin trapped small particles with focused laser beam. See A. Ashkin, J. M. Dziedzic, J. E. Bjorkholm and S. Chu, "Observation of a single-beam gradient force optical trap for dielectric particles", Optical letters, vol. 11, no. 5, 1986. See also A. Ashkin, Science 210, 1081, 1980. This seminal work by Arthur Ashkin, Joe Dziedzic, John Bjorkholm, and Steven Chu at Bell Laboratories (now Lucent Technologies) demonstrated how to pick up and move tiny latex spheres using nothing more than a microscope lens and a low-power laser.

This was followed by the demonstration of live biological cell trapping. See A. Ashkin and J. M. Dziedzic, "Optical trapping and manipulation of viruses and bacteria", Science, vol. 235, 1987. See also A. Ashkin, J. M. Dziedzic and T. Yamane, "Optical trapping and manipulation of single cells using infrared laser beams", Nature, vol. 330, 1987.

Still more recently, Chu, a recent Nobel Prize winner, has used tightly focused beams of light to capture and manipulate strands of DNA.

For biological applications, near infrared lasers are used to prevent damage due to light absorption. Nd: YAG, Nd: YLF, Ti: Sapphire or diode lasers are the most commonly used light sources for optical trapping applications. Besides single-beam optical traps, multi-beam tweezers were developed to manipulate small size objects (2 mm). The most common methods in building multi-beam tweezers can be listed as follows:

First, a single beam can be split with a beamsplitter and recombined with refractive optics. See K. Sasaki et al., Optical Letters 16, 1463, 1991. This technique is limited by the number of trapping beams.

A second method of optical trapping, or tweezing, produces time-averaged extended trapping patterns made by the fast scanning of a single trapping beam. This method, producing simple interference fringe patterns, is limited.

A third method of optical trapping, or tweezing, is based on split and steered light from a single beam with diffractive optical elements. Computer generated holographic techniques can be used to create customized particle arrangements with a single beam. See K.

Sasaki et al., Optical Letters 16, 1463, 1991. See also L. P. Faucheux and A. J. Libchaber, Phys. Rev. E 49, 5158, 1994. Only particles having a low index of retraction can be trapped with this method. Moreover, optical waveforms generated by holograms are notoriously non-uniform, and do now have any adjustability.

Finally, addressable liquid crystal phase shifting arrays permit dynamically active tweezing.

The existing methods do not, to the best knowledge of the inventors, use a Vertical Cavity Surface Emitting Laser (VCSEL) as the source of a laser beam, let alone many such VCSELs.

The existing methods do not, to the best knowledge of the inventors, permit multiple objects to be manipulated in parallel at the same time. Neither do they permit multiple "trapping" or "tweezing" optical beams to be focused onto a single, potentially quite large, object at a single time in order to exert more optical force on the object. The present invention will be seen to permit either, and both.

The laser beam(s) used in existing optical trapping and tweezing methods have, to the best knowledge of the inventors, energy distributions—meaning the distribution of illumination energy across, and perpendicular to, a laser beam—the that are uncontrolled, and that are most commonly Hermite-Gaussian. A laser so producing a laser beam of Hermite-Gaussian energy distribution is spoken of as operating in Hermite-Gaussian mode, which mode is the default operating mode of a laser. The default production of laser beams of Hermite-Gaussian energy distribution is perhaps understandable when it is understood that it has not heretofore been understood how to create, save possibly by the use of a holographic element (which holographic element would be at least cumbersome and more likely completely unsuitable in optical tweezers), a laser beam having a superior Laguerre-Gaussian energy distribution. The present invention will be seen to prefer the use of a laser beam having the superior Laguerre-Gaussian energy distribution in optical trapping and tweezing. The present specification disclosure will, by incorporating by reference a co-pending patent assigned to the same assignee as is the present invention, show how such a Laguerre-Gaussian energy distribution laser beam may reliably be realized, including as is produced by a VCSEL.

Existing optical trapping and tweezing methods neither contemplate nor offer much controllability in the power of the laser beam, it being deemed sufficient that the beam remains adequately intense so as to effect the desired spatial manipulations of the trapped or tweezed object at the desired rates. However, should optical trapping and tweezing be contemplated to transpire in parallel upon a one- or two-dimensional array of manipulated objects by use of a corresponding array of laser beams (both of which one and two-dimensional arrays will be seem to contemplated by the present invention) then the laser beams would desirably be uniform across the array, including by potential to independently adjust the intensity of each laser beam if warranted. The present invention will show that some array manipulations do so warrant adjustment of the arrayed manipulating laser beams, and will how this may be realized in a broad and substantial manner.

Finally, most existing optical tweezing apparatus are extended in size, and are not compact, due to the required bulky laser sources. The present invention will be seen to be opposite, and to be compact in size.

The existing optical tweezing methods and apparatus are also, commonly, constrained in (i) the types of applications which can be realized, and/or (ii) the nature and range of the (small) objects subject to manipulation, by a single method, or a single apparatus. This is, of course, opposite to common macroscopic mechanical tweezers, or pliers, or the like which usefully fit a broad range of work pieces. The present invention will be seen to address this issue, and to concern a new method, and apparatus, capable of realizing ubiquitous, and versatile, optical trapping and tweezing functions. See M. Ozkan, M. M. Wang and S. Esener "Pick and Place of organic and inorganic devices with VCSEL driven optical micro-beams", HOTC conference proceedings, Santa Barbara, July 2000.

SUMMARY OF THE INVENTION

The present invention contemplates the use of a vertical cavity surface emitting laser (VCSEL), or an array of VCSELs for the trapping of one or more microparticles. By the use of VCSELs bulky regular lasers are avoided. The multiple microbeams produced by an array of VCSELs are individually controllable in intensity. They permit the manipulation—including the transport—of various trapped objects—including as may be of various sizes and masses—in parallel and concurrently.

Conversely, a number of VCSEL beams can be focused upon a single object for enhance optical power, and manipulation forces. The new optical tweezing method and apparatus of the present invention can be used for the handling of both (i) inorganic and (ii) organic, biological objects, including in vivo.

The VCSELs nominally operate at 850 nm wavelength. They produce light output in either a Hermite-Gaussian or, strongly preferably, a Laguerre-Gaussian energy distribution. An array of VCSELs may selectively pick and place multiple arrayed objects simultaneously, and at massive parallelism, by the simple expedient of moving a stage supporting the objects relative to the arrayed VCSELs.

The one or more objects trapped and/or manipulated by the VCSEL-based optical traps and tweezers of the present invention may usefully have been electrically spatially pre-positioned, positioned, or re-positioned by use of, inter alia, an electrically conductive support stage in a manner that is totally non-conflicting with the optical trapping and tweezing. In simple terms, the possibility of synergistically combining two separate positioning and manipulating methods—both optical and electrical—is offered by the present invention, including as may usefully be applied in parallel to vast numbers of arrayed small objects. This power, and this flexibility, permits small, even microscopically-sized, objects to be selectively controllably moved around on a substrate, both individually and jointly in combinations and collectively, much in the manner that macroscopic items are moved through an automated factory.

Especially by use of multiple laser beams (as originate at multiple VCSELs), even a relatively large size object, >5 μm, may be picked and placed. Transport of two-dimensional object arrays is readily realized by two-dimensional VCSEL arrays.

1. VCSEL-, and VCSEL Array-, Based Optical Tweezers

In one of its aspects the present invention is embodied in an optical trap, or optical tweezers, using laser light derived from at least one Vertical Cavity Surface Emitting Laser, or VCSEL.

The laser light can be developed by an array of VCSELs, a number of the VCSELs of the array simultaneously illuminating a number of objects at a number of different locations so as to optically tweeze the objects at the locations concurrently, and all at a single time.

The at least one VCSEL can be spatially moved relative to an object that is being illuminated by the laser light of this at least one VCSEL, therein spatially moving the at least object.

Optical tweezers based on either (i) a VCSEL, or (ii) an array of VCSELs, are operable to optical tweeze an object that has been electrically spatially pre-positioned.

Within the optical tweezers, (i) the VCSEL, or (ii) the array of VCSELs, preferably emits laser light in a Laguerre-Gaussian mode.

The optical tweezers are capable of manipulating one or more object >5 μm in size.

2. A Method of Optically Trapping and Tweezing

In another of its aspects the present invention is embodied in a method of optically trapping and tweezing where at least one object is trapped in, and/or spatially manipulated by, the laser light of a vertical cavity surface emitting laser, or VCSEL.

Optical spatial manipulation may be of a number of objects trapped in the laser light beams of a corresponding number of arrayed vertical cavity surface emitting lasers, or VCSELs. This optical spatial manipulation may be (i) simultaneously of all the trapped objects at the same time, or (ii) selective, with some of the objects being manipulated while others of the objects are not.

The spatial manipulation may arise from spatially moving at least one VCSEL relative to a particular object that is being illuminated by the laser light of this at least one VCSEL, thereby serving to spatially move the at least object.

At a time before, during or after the optical spatial manipulation, one or more objects may also have been, or be electrically spatially pre-positioned, positioned, or repositioned.

The optical spatial manipulation is preferably with laser light, from the one or more VCSELs, having a Laguerre-Gaussian power distribution.

So performed, the method of the present invention is capable of optically spatially manipulating an object >5 μm in size.

3. Concurrent Optical Manipulation of Several Objects

In yet another of its aspects the present invention is embodied in optical tweezers serving to concurrently optically manipulate several objects at the same time.

Such optical tweezers include (i) a stage holding several optically manipulatable objects, and (ii) several laser light beams for concurrently optically manipulating the several objects.

These several laser light beams preferably originate in a like number of Vertical Cavity Surface Emitting Lasers, or VCSELs.

The stage is preferably spatially movable relative to the several laser light beams, therein making that the concurrent optical manipulation of the several objects may be realized by a simultaneous moving of the several objects.

The optical tweezers may still further, optionally, include a source an electric field for electrically manipulating the plurality of objects upon the stage.

4. Multiple Laser Beams Optically Manipulating a Single Object

In still yet another of its aspects the present invention is embodied in optical tweezers where multiple laser beams are focused upon a single object at the same time to enhance the optical force imparted thereto (and not so as to serve some esoteric prior art function un-related to optical tweezing such as the inducement of fluorescence by two-photon absorption).

Such optical tweezers include (i) a stage holding at least one object where it is impinged upon by (ii) several laser light beams, the collective laser light beams serving concurrently to optically manipulate the at least one object.

5. Multiple Independently Controllable Laser Beams for Optically Manipulating Multiple Objects In still yet another of its aspects the present invention is embodied in optical tweezers where each of multiple laser beams focused upon a corresponding object is independently controllable.

The multiple laser beams are preferably organized in a regular geometric array. Each laser beam is preferably controllable independently of all other laser beams in both its "ON" and its "OFF" conditions and, further, in its intensity. The laser beams are preferably derived from VCSELs, with a usefully broad range of intensities (and corresponding optical forces induced in the illuminated object) being obtained by varying the drive current of each VCSEL independently.

6. Manipulation of an Object, and of Several Objects, Independently by each, and by both, Optical and Electrical Forces, Including at Different Times or at the same Time In still yet another of its aspects the present invention is embodied in optical tweezers permitting that one or more objects may be independently manipulated by either, or by both, optical and electrical forces, including at different times or at the same time.

The optical manipulation is preferably realized by one or more laser light beams emitted from one or more VCSELs. The electrical manipulation is preferably realized by an electrical field between a conductive electrodes at least one of which is transparent, and through which shine the one or more laser light beams.

7. Optical Tweezers Using Laser Light with a Laquerre-Gaussian Energy Distribution In still yet another of its aspects the present invention is embodied in optical tweezers using laser light with a Laguerre-Gaussian energy distribution.

The preferred source of this laser light with a Laguerre-Gaussian energy distribution is a Vertical Cavity Surface Emitting Laser, or VCSEL.

The laser light may be constituted as a number of laser light beams each with a Laguerre-Gaussian energy distribution. In this case the several laser light beams are preferably derived from an array of Vertical Cavity Surface Emitting Laser, or VCSELs.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 2, consisting of FIGS. 2a through 2c, are prior art diagrammatic illustrations of, respectively, an up or a down or a left force pushing an object, illustrated as a microsphere, toward the focus of a light beam.

FIG. 13 is a diagram of the pre-positioning, positioning, and/or re-positioning of objects optically manipulated in accordance with the present invention by an electrical field.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

Figure 1:
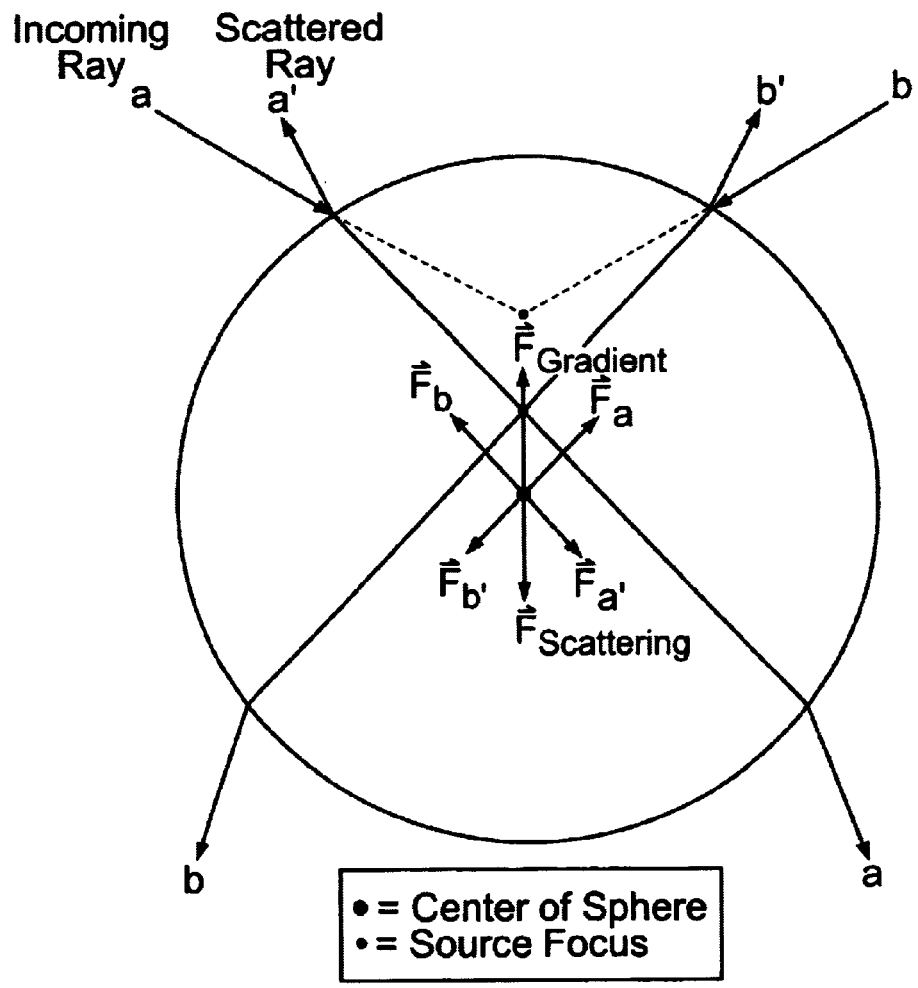
FIG. 1 is a prior art diagrammatic illustration of the gradient, and scattering, forces produced on a particle by incoming, and reflected/scattered (or diffracted/scattered) rays of light.

1. Principles of Optical Trapping/Tweezing, and Previous Trapping/Tweezing Apparatus The gradient, and scattering, forces produced on a particle by incoming, and reflected/scattered (or diffracted/scattered) rays of light a, b are illustrated in FIG. 1. The manner by which a particle, illustrated as a microsphere, is pushed toward the focus, whether up or down or left, is respectively illustrated in FIGS. 2a–2c. In each FIG. 1, 2a, 2b, 2c both the center of the sphere and the source focus are illustrated as dots. The gradient force F is also shown.

Figure 3:
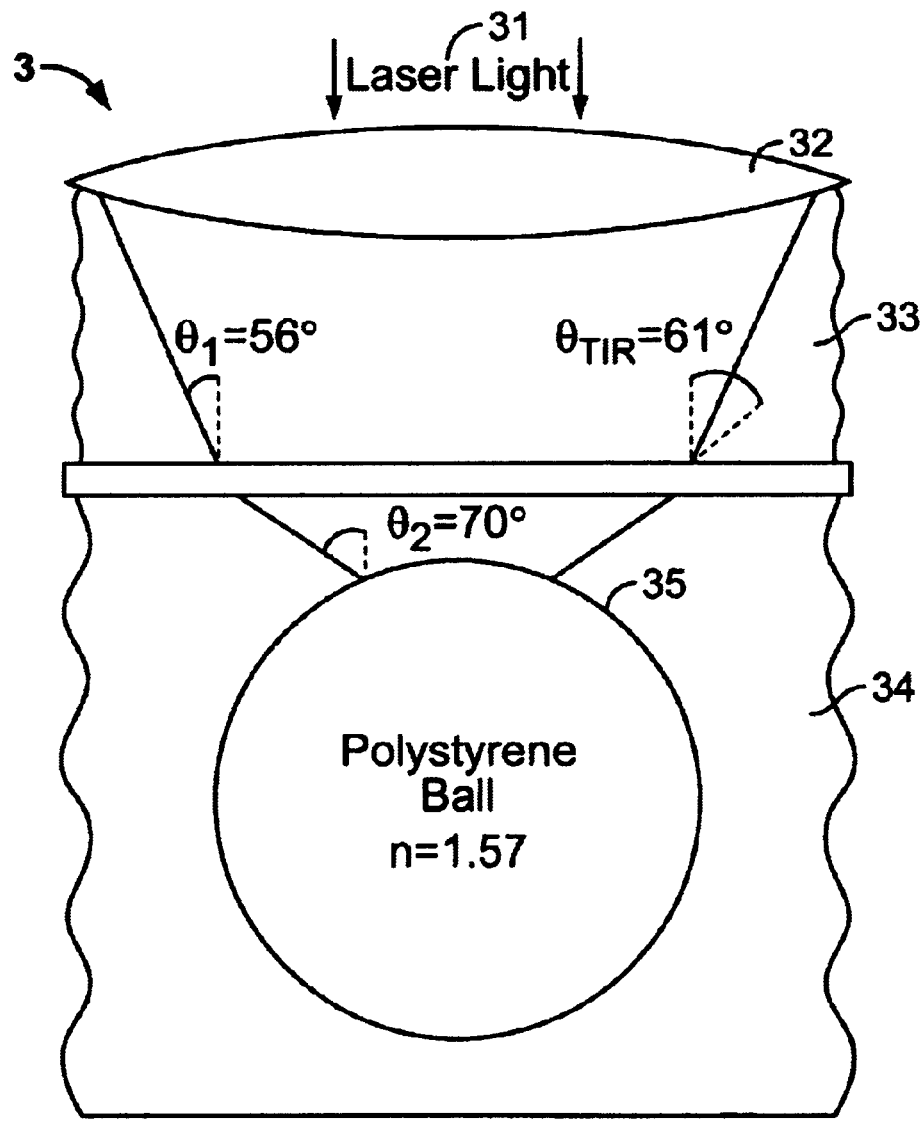
FIG. 3 is a prior art diagrammatic illustration of an optical trap.

The operative section 3 of an optical trap of the prior art may have, by way of example, the configuration illustrated in FIG. 3. Laser light 31 is passed through a microscope-type objective lens 32, index-matching oil 33, and buffer solution 34 to exert a force on a polystyrene ball 35. The objective lens 32 typically has a numerical aperture of 1.25. The oil 33 has an index of refraction of, typically, 1.515: the buffer solution 34 has an index of refraction of, typically, 1.33; and the polystyrene ball 35 has an index of refraction of, typically, 1.57. These indices of refraction will produce refraction angles $\theta_1=56°$, $\theta_{TIR}=61°$, and $\theta_2=70°$, as illustrated.

Figure 4:
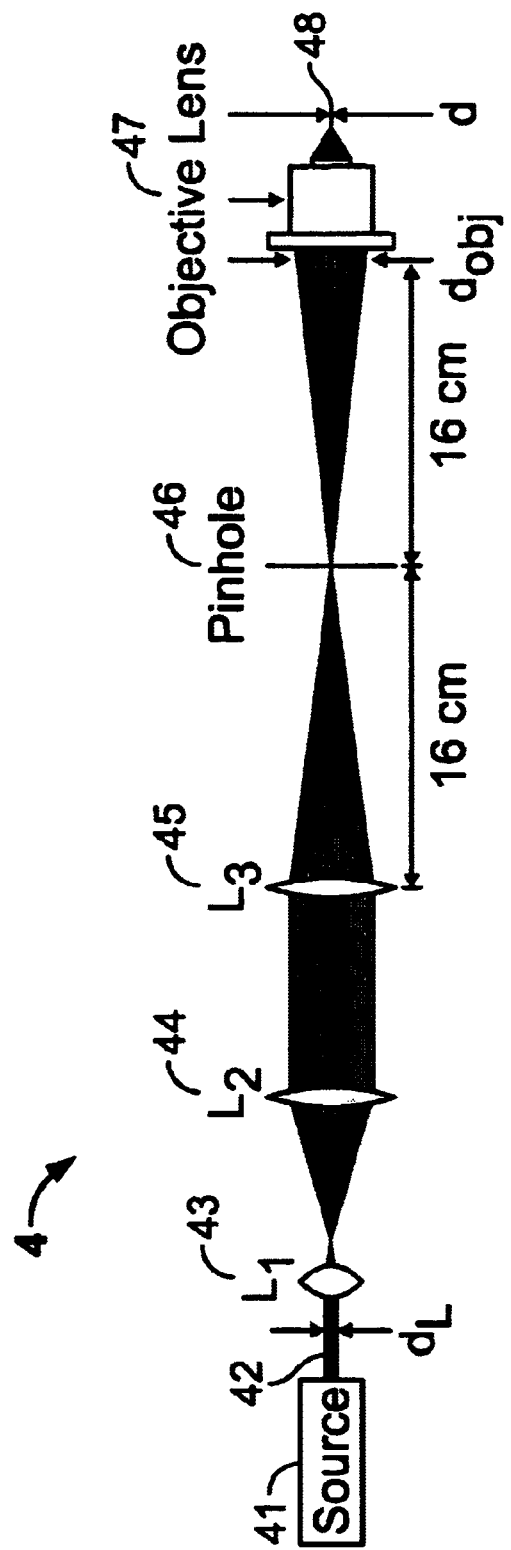
FIG. 4 is a prior art schematic illustration of a rudimentary optical tweezers.

A rudimentary prior art optical trap 4 is shown in FIG. 4. A source of laser light 41 produces a laser beam 42 of diameter $d_L$ that is focused by a lenses $L_1$ 43, $L_2$ 44 and $L_3$ 45 to pass through a pinhole aperture 46 and, at diameter $d_{obj}$ matching the numerical aperture, into an objective Lens 47. The objective lens 47 focused the laser light into a diameter d where it impinges upon a specimen work piece 48 (as is normally held upon a stage, not shown).

Figure 5:
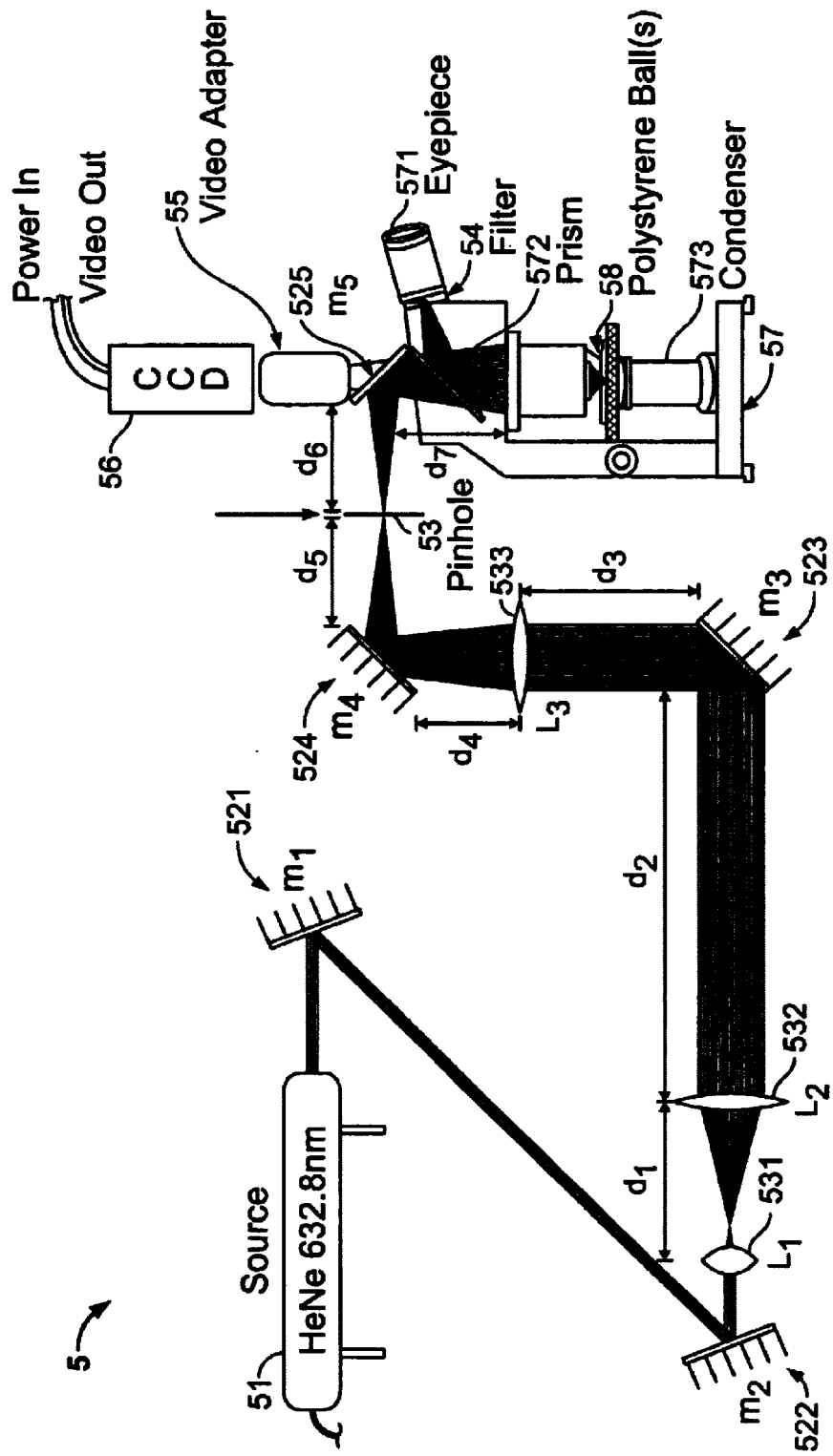
FIG. 5 is a prior art schematic illustration of an exemplary optical tweezers.

A more sophisticated, typical, prior art optical tweezers 5 is shown in FIG. 5. The extent of this prior art apparatus will be usefully compared with the simplicity of the preferred, and more capable, preferred apparatus 6 of the present invention shown in FIG. 6. In accordance with the optical path of the optical trap 4 of FIG. 4 just discussed, and the principles of optical tapping and tweezing of FIGS. 1 and 2, the optical path, and optical tweezing function, of the prior art optical tweezers 5 of FIG. 5 should be understandable.

The prior art optical tweezers 5 of FIG. 5, constructable by any optical research laboratory, cost about $6,500 (circa 2001) in equipment. Commercial optical tweezers currently (circa 2001) sell for about $50,000. The simple optical tweezers 5 of FIG. 5 is associated with the Prentiss Group, and efficiently and effectively supports a wide variety of interesting experiments (as will the apparatus of the present invention, also).

Components of the optical tweezing apparatus 5 include one HeNe 632.8 nm (red) laser 51, 20 mW Melles Griot p/n 05-LHP-925; one laser power supply (not shown) also from Melles Griot; four, m1 521–m5 525, 25 mm mirrors Edmund p/n A30,626; five kinematic mirror mounts (not shown) for 1" optics ThorLabs p/n KM1; seven 2" long, 0.5" diameter posts (not shown), ThorLabs p/n TR2; seven 2" post holders (not shown), ThorLabs p/n PH2-ST; seven post holder bases (not shown), 3" ThorLabs p/n BA1; one lens L1 531=25 mm, f=5.0 cm, uncoated Edmund p/n A32,624; one lens L2 532=25 mm, f=20.0 cm, uncoated Edmund p/n A32,902; four lens holders for 1" lenses (not shown), ThorLabs p/n LMR1; two large posts (not shown) 14" long, 1.5" diameter, ThorLabs p/n P14; one post base (not shown) 2.5" diameter, ThorLabs p/n PB1; five mounting post clamps (not shown) 1.75"×2.50", ThorLabs p/n C1501; seven posts (not shown) 4" long, 0.5" diameter, ThorLabs p/n TR4; one lens L3 533 =25 mm, f=17.5 cm, uncoated, Edmund p/n A32, 877; one pinhole 53, diameter=25 micron, Edmund p/n A36,390; one four swivel post clamps (not shown), ThorLabs p/n SWC; three separation filters (one only filter 54 shown), 25 mm, cyan Edmund p/n A52,537; one oil immersion objective (not shown), 100×, NA=1.25 Edmund p/n A38,344; one microscope immersion oil objective (not shown), Edmund p/n A38,502; one Thru-Type microscope video adapter relay lens 55, Edmund p/n A39,925; one CCD camera 56 type IRIS hi-resolution, Sony p/n SSC-M374; one black and white monitor (not shown), Sony p/n SSM-121; and one microscope 57, trinocular, plan optics, Accu-Scope type 3001PL (including, inter alia, eyepiece 571, prism 572 and condenser 573).

In setting up the tweezing apparatus 5 of FIG. 5 the trap spots will appear very bright on the monitor (not shown in FIG. 5)—a dichroic beam splitter acting as a polarizer transmitting light of a certain polarization and reflecting light perpendicular to that. The reflection of the light off of the work piece polystyrene ball(s) 58 (not part of the tweezers 5) will, if properly polarized, be transmitted through the dichroic beam splitter to the CCD camera 56, and will appear as a bright spot on the monitor (not shown in FIG. 5). Inserting a waveplate or rotating the dichroic beam splitter itself will fix this problem by reflecting the light reflected off of the polystyrene balls 58. Polystyrene balls 58 make a good choice for initial trapping experiments. They are available in a variety of sizes, have a long storage life, have an index of refraction of around 1.57, and can be trapped with a variety wavelengths without damage. There are a large number of suppliers of these balls including Polyscience, Inc. (Warrington, Pa.) and Bangs Laboratories, Inc. (Fishers, Ind.).

If these polystyrene balls, or spheres, 58 are simply added to a distilled water solution, the spheres tend to clump together and stick to the cover slip and slide. To minimize this behavior the spheres are suspended in a phosphate-buffered saline solution (PBS). Similar solutions are commonly used for suspending biological specimens. The formula for PBS is (percentage by weight): 0.8% NaCl 0.02% KCl 0.02 M PO4, pH 7.3. In addition to using PBS, an additional anti-stick additive is usually used. For non-biological specimens this is usually polyethylene glycol. For biological specimens, polyethylene glycol cannot be used and bovine serum albumin (BSA) can be used instead. As with all chemicals, the material data safety sheets for these materials should always be carefully reviewed before using them.

It is important that the focus of the CCD camera 56 should be the same as the trapping beam's focus, so that trapped particles (the polystyrene balls 58) are in focus when viewed on the monitor. This allows one to tell whether the specimen is properly trapped or not. To match these focuses properly, first get the camera at the proper distance above the trapping objective. One way is to just calculate the proper distance the video adapter must be from the back pupil of the objective, and fix the camera position accordingly. A better way is to view a sample through the eyepieces of the microscope and move the camera up and down until the samples look the same on the monitor as they do in the eyepieces. No laser is necessary for this part of the alignment; the user should be careful when looking into the mounted eyepieces.

Proof of correct setup involves trapping something simple like a polystyrene sphere, lift it up and away from the bottom. If the ball is in focus on the monitor then the camera focus and beam focus are the same. If not, remove the alignment pinhole and move lens L3 533 along the beam path until a trapped specimen is in focus. Insert the pinhole 53 properly, realign the beam into the microscope video port if necessary, and you are done. Note that if the trapping beam is not well collimated before lens L3 533, this procedure may not work. Trapping along the z-axis (axis of beam propagation) is weakened by spherical aberrations that increase with depth below the cover slip.

When trapping it is useful to know how deep the sample slide is, as an indicator of how good 3D trapping will be. To measure this, microscope stage's z-axis knob is first calibrated so that angular rotation can be translated into the actual distance the z stage moves. This is realized by loading the oiled sample slide, turning on the camera and monitor, turn on the laser source, but shutting off the microscope's white light source. The microscope stage is raised until the oil drop hits the objective, and is then continued to be raised very slowly until a clear focussed spot is seen on the monitor. This is the reflection of the laser beam on the bottom of the cover slip, and marks the top of the liquid on the slide. This point is noted on the z-axis knob. The stage is continued to be raised, diffusing the spot, until the spot reappears focussed. This is the reflection of the laser beam on the surface of the glass slide, and marks the bottom of the liquid. This point is noted on the z-axis knob, and thereafter the z-axis knob calibration is used to calculate the depth of liquid on the slide.

2. Optical Tweezers, and Optical Tweezing, in Accordance with the Present Invention A preferred optical tweezing apparatus, or optical tweezers, 6 in accordance with the present invention is shown in the schematic diagram of FIG. 6.

The optical tweezing apparatus 6 is distinguished by use of one or more Vertical Cavity Surface Emitting Lasers (VCSELs) 61—each of which may have either a Hermite or, preferably, a Laguerre Gaussian light emission mode—for illumination.

Figure 6:
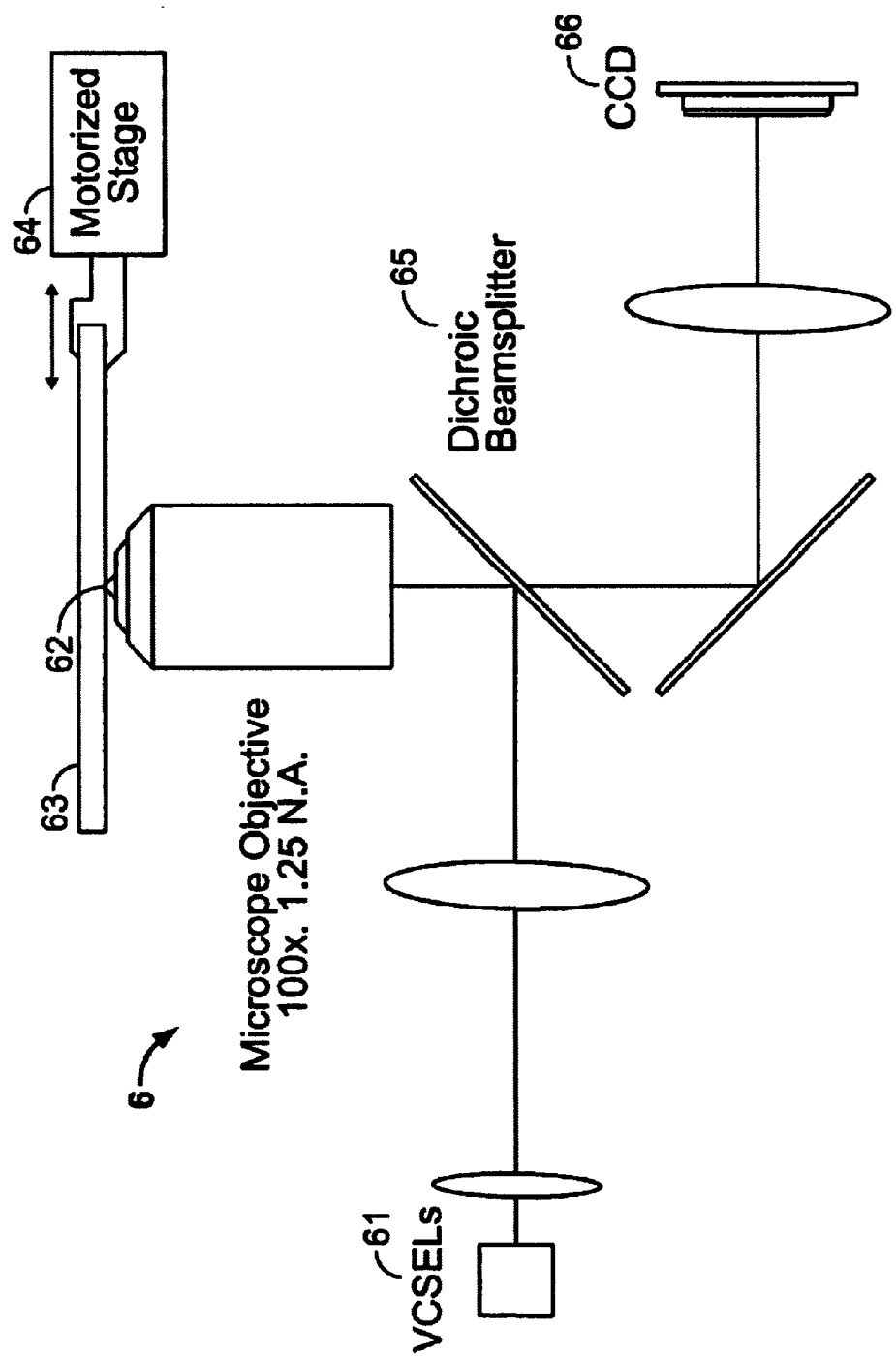
FIG. 6 is a schematic diagram of optical tweezers in accordance with the present invention.

The apparatus 61 of the present invention schematically illustrated in FIG. 6 uses the same principles as other optical tweezers, and the optical tweezers 5 of FIG. 5. An optical beam illuminates one or more objects 62 (not part of the apparatus 6) under examination and, since this (these) object(s) 62 will be at its (their) energy minimum where the light is focused, the object(s) will move to the focal point of the optical beam(s) and become trapped by the optical beam(s). The same object(s) can be transferred to a new location(s) either by moving the illuminating beam(s) or by moving the supporting substrate 63, such as by a motorized stage 64. As before in the apparatus 5 of FIG. 5, a dichroic beamsplitter 65 permits that the object(s) 62 should be both (i) illuminated for tweezing and (ii) viewed in an optical path proceeding to camera CCD 66.

It should be understood in FIG. 6 that many VCSELs can be closely arrayed, and that the optical paths, although illustrated in FIG. 6 by but a single line, can represent many parallel laser beams. The optical tweezers 6 of FIG. 6 is thus suitable to tweeze not only a single object 62 with a single laser beam, but a number of objects 62 concurrently with a corresponding number of laser beams. Slightly sub-optimal focusing of peripheral beams when many such (as are normally arrayed) are employed is not a problem: after all, the purpose of the optical tweezers 6 is to exert forces, not, for example, to illuminate specimens for microphotography. There may be, however, a slight difference in the optical power delivered to different ones of multiple (arrayed) objects 62, and compensation for this effect may be realized by the simple expedient of selectively adjusting the drive current to each of the (arrayed) VCSELs 61, producing thereby an associated laser beam of relatively greater, or lessor, intensity.

Figure 7:
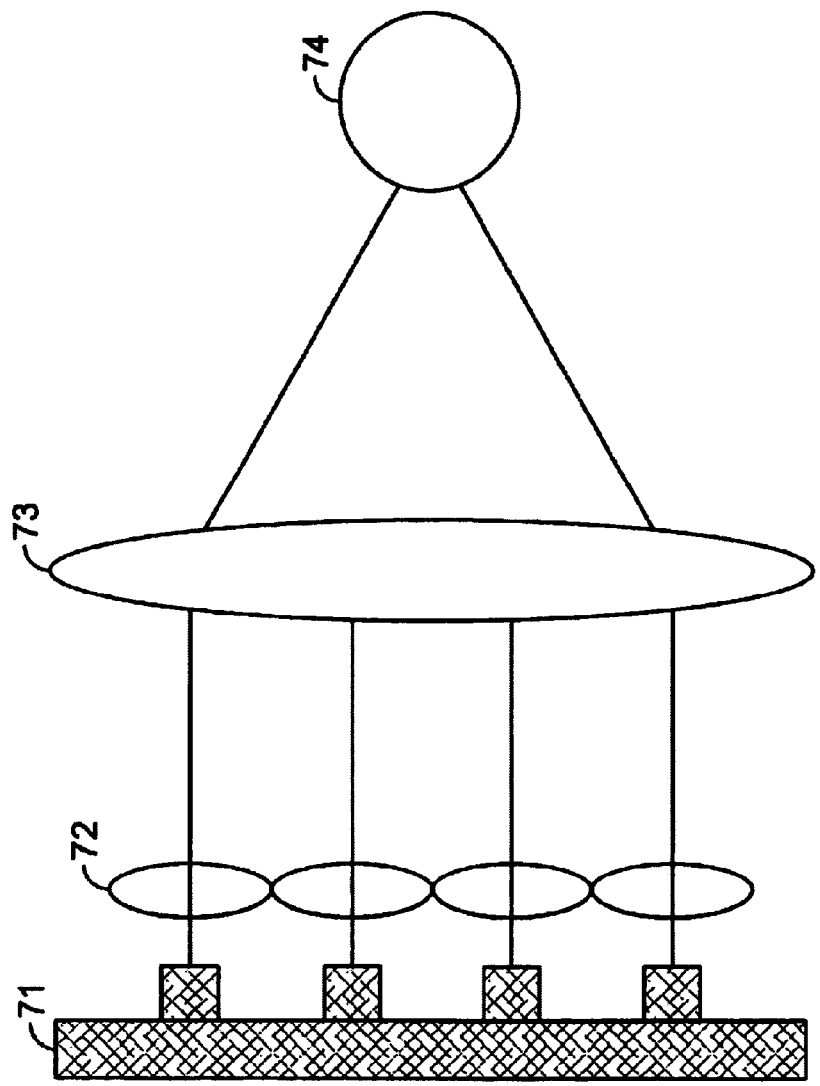
FIG. 7 is an illustration of a focused light beam, suitable for use in the optical tweezers in accordance with the present invention previously seen in FIG. 6, arising from an array of Vertical Cavity Surface Emitting Lasers (VCSELs); the light from the several VCSELs being focused to achieve a stronger lift power for large size objects.

A single micro beam can be insufficient to transport large size objects (>15 μm). By using an array of micro lenses attached to VCSEL micro beam arrays as illustrated in FIG. 7 a various number of micro beams can be combined together to obtain a stronger beam to trap and manipulate large size objects. Note that this is similar to, but different from, the concept just discussed in conjunction with FIG. 7. Note the different number of lenses in the optical path of FIG. 7 from that of FIG. 6 (one lens versus two lenses). Just as it is possible to focus each of a number of VCSEL-originated parallel laser beams onto an individually associated object (as is one setup of the optical tweezers 6 of FIG. 6), so also is it possible to focus multiple laser beams onto a single specimen (as in FIG. 7).

This could be achieved by using various types of optical setup. FIG. 7 shows the preferred optical setup with laser light emissions from VCSEL array 71 being first focused in a microlens array 72 and then by lens 73 to become focused on an object 74 (object 74 is not part of the apparatus of the invention). A practitioner of the optical engineering arts will recognize that, in accordance with the principle of optics, the VCSEL array of FIG. 5 can be variously scaled in number and in size, and adapted as a laser light source in the optical tweezers 6 of FIG. 6.

Although both the optical tweezers 5 of the prior art (FIG. 5) and the optical tweezers 6 of the present invention (FIG. 6) use lasers for illumination, the use of a VCSEL micro beam array (FIGS. 6 and 7) in accordance with the present invention provides the capability to trap and manipulate objects in a parallel fashion. In addition, the size and the cost of the optical tweezers in accordance with the present invention is reduced significantly from heretofore.

In the optical tweezers 6 of the present invention (shown in FIG. 6), the intensity of light at the object can be adjusted by changing the size of one or more openings in the beam(s) path(s), and/or, preferably, by changing the driving current of the illumination source (laser, micro beam arrays, VCSEL arrays, etc.)

Advantages of the optical tweezers apparatus 6 of the present invention include compactness. In the array form of the apparatus, multiple objects can be simultaneously individually manipulated, including with massive parallelism.

The VCSELs of an arrays can be used collectively in order to transport relatively large size objects, as illustrated in FIG. 7. In the preferred Laguerre-Gaussian light output mode (discussed further hereinafter), an optimally strong capture power per unit radiation intensity is achieved.

The preferred optical tweezers apparatus 6 of the present invention is low in cost. It is eminently suitable for bioengineering applications as well as electronic and optoelectronic applications.

3. Results Obtained by the Apparatus and Method of the Present Invention

An inverted microscope optical tweezers in accordance with the present invention was assembled as follows: VCSEL driven optical micro beams were first collimated and focused on the sample plane by using a high magnification microscope objective (100× magnification, 1.25 N.A.). A dichroic beamsplitter under the microscope objective provided in-situ observation through a CCD camera.

Figure 8C:
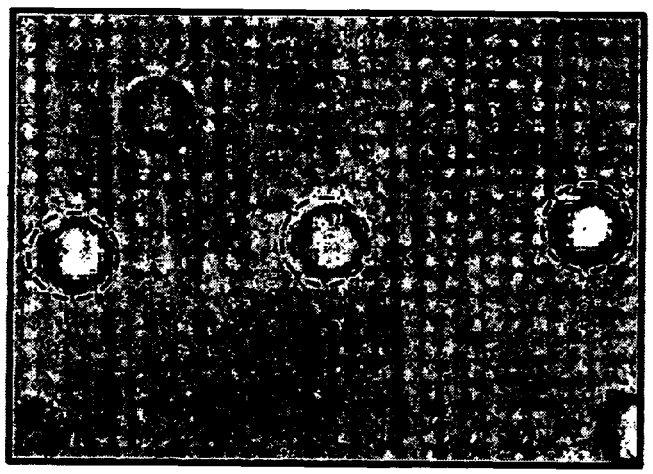
FIGS. 8a–8c are a set of three photomicrographs showing the picking, and the placing at new locations, of and exemplary three 5 µm polystyrene spheres concurrently, the picking and placing being in accordance with, and by action of a multiple VCSEL-originated laser beam optical tweezers of, the present invention.
Figure 8B:
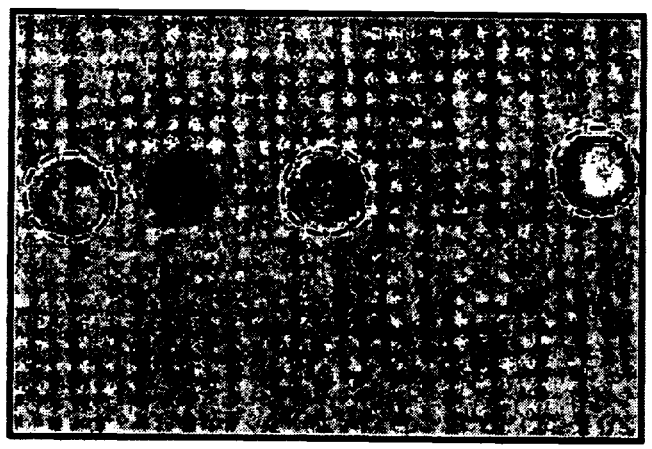
Figure 8A:
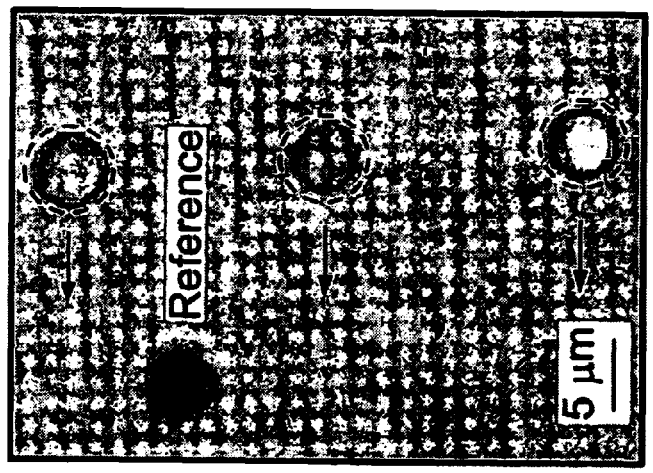

FIG. 8, consisting of FIGS. 8a through 8c, shows the parallel transport of a 3×1 array of 5 μm diameter polystyrene spheres in a solution by using VCSEL driven micro optical beams. The trapping force was calculated from measurements based on the Stokes' drag law on a sphere in a liquid per the following equation:

$$F = 6\pi\eta rv$$

where F is the drag force on the spherical object, η is the viscosity of the solution, r is the radius of the object and v is the velocity of the object. See G. K. Batchelor, "An introduction to fluid dynamics", Cambridge, 1991.

During velocity measurements, spheres were moved up in the z-axis to prevent possible measurement errors due to surface effects. The optical beam path was kept continuous but the object on the substrate was moved with a motorized stage.

The set of three photomicrographs of 5 μm polystyrene spheres of FIGS. 8a–8c shows that the microspheres can be both (i) picked, and (ii) placed to a new location, concurrently by VCSEL driven multi micro beams.

Adjusting the driving current for the VCSEL altered the optical beam power. When VCSEL array was driven with an applied current of 14 mA, polystyrene spheres were transported on the glass substrate at a speed of 8.3 μm/sec. The optical trapping force on 5 μm diameter spheres was calculated as 0.39 pN.

Figure 9:
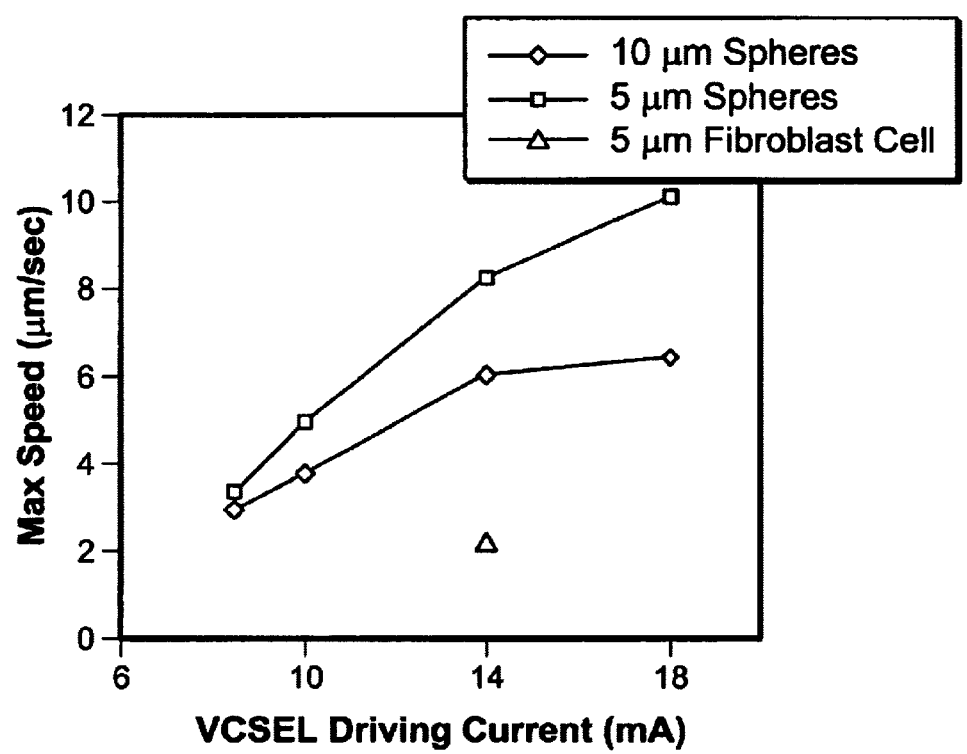
FIG. 9 is a graph showing comparison of maximum drag speed for spheres of different sizes.

Similar experiments were conducted with 10 μm diameter polystyrene spheres as well. The effect of object size on the velocity at a given applied current is summarized in the graph of FIG. 9. FIG. 9 shows a comparison of the maximum drag speed achievable with the preferred optical tweezing apparatus of the present invention, shown in FIG. 6, for spheres of different sizes.

The trapping force was found to increase with the object size and the velocity which also correlates with Equation 1. In addition, larger size objects were moving slower than smaller size objects at a given VCSEL power. This behavior is also in good agreement with Equation 1.

For biological applications, mouse 10 μm diameter 3T3 fibroblast cells were manipulated with single VCSEL driven optical micro beam. The cells were continuously monitored for a week after they were exposed to the laser beam. There was no evidence of possible cell damage from the laser beam. Cells continued their regular cell functions and they attached, spread and divided into daughter cells by mitosis.

Figure 10A:
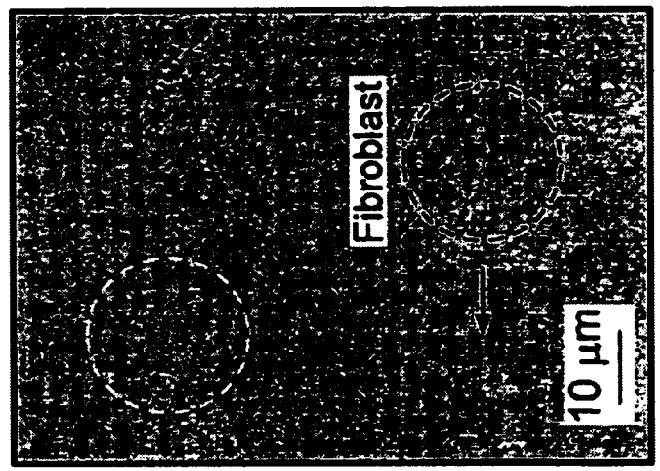
FIG. 10, consisting of FIGS. 10a through 10c, are photomicrograph of mouse 3T3 fibroblast cells being manipulated with optical tweezers in accordance with the present invention employing multiple VCSEL-driven micro laser beams.
Figure 10B:
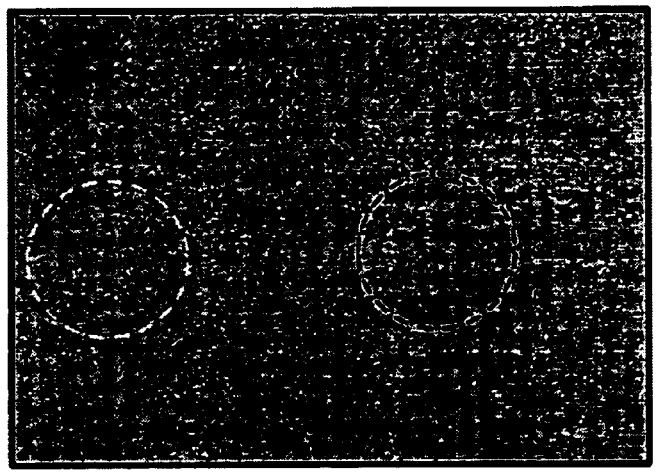
Figure 10C:
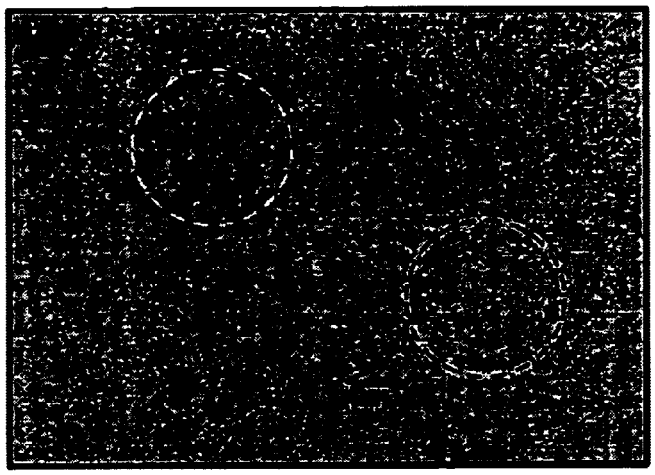

FIG. 10, consisting of FIGS. 10a through 10c, illustrates the transport of a 10 μm diameter fibroblast cell on a glass substrate with a VCSEL driven optical micro beam. The photomicrograph of FIG. 3 is particularly of mouse 3T3 fibroblast cells being manipulated with VCSEL driven micro beams.

The velocity measurements in FIG. 9 demonstrated that the live fibroblast cell was held less strongly in the trap most probably due to its lower dielectric constant and irregular shape (not a perfect sphere). A 5 μm cell was transported with a speed of 2 μm/sec, which is about four times (×4) slower compared to the same size polystyrene sphere. During velocity measurements the glass substrate surface was pre-treated with a non-adhesion-promoting chemical to prevent possible measurement errors because of cell-substrate adhesion.

4. Preference for Laquerre-Gaussian Mode Laser Beams

Figure 11A:
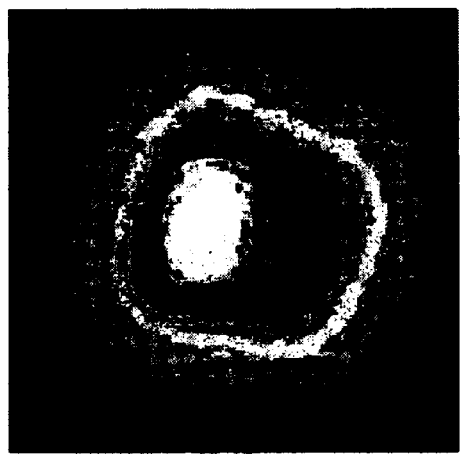
FIG. 11a is a representation of the energy distribution across a Hermite-Gaussian mode laser beam.
Figure 11B:
FIG. 11b is a representation of the energy distribution across a Laguerre-Gaussian mode laser beam.
Figure 12:
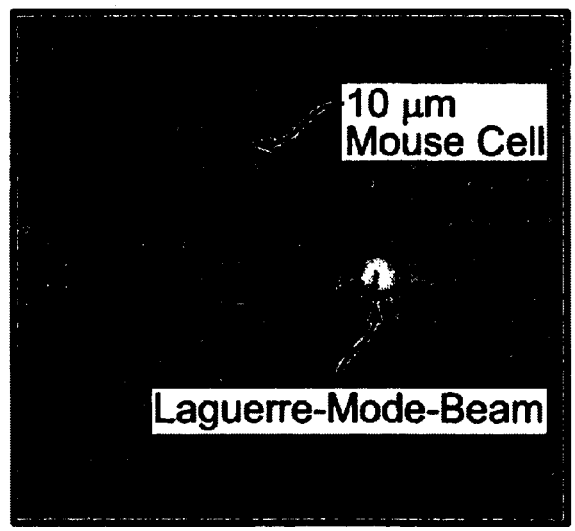
FIG. 12 is a table of the measurement of a trapping force exerted on a 10 µm sphere as a function of driving current in the optical tweezers in accordance with the present invention.

Laguerre-Gaussian, or simply "Laguerre" mode beams are preferred for use in the optical tweezers apparatus of the present invention. The energy distributions across a Hermite-Gaussian, and a Laguerre-Gaussian, laser beam are respectively illustrated in FIGS. 11a and 11b. The Laguerre-Gaussian beams—the appearance of one such in action to move a 10 μm mouse cell being shown in the photomicrograph of FIG. 12—were found to have a stronger trapping force than Hermite-Gaussian mode beams. The technique described in co-pending U.S. patent application Ser. No. 09/451,248 filed Nov. 29, 1999 (claiming benefit of Provisional Patent Application Ser. No. 60/110,24 filed Nov. 30, 1998), for CURRENT ANNEALING SEMICONDUCTOR LASERS TO ENHANCE PRODUCTION OF CIRCULARLY-SYMMETRIC LAGUERRE-GAUSSIAN DISTRIBUTION LASER BEAMS to inventors including the selfsame Sadik Esener who is an inventor of the present invention, is preferred for making Laguerre-Gaussian mode VCSELs. The contents of this related patent application are incorporated herein by reference.

That application teaches that Laguerre-Gaussian laser beams of varying modal order may be achieved with increasing drive current of the VCSELs. In particular, a process is taught for conditioning, normally as part of the final manufacturing process, lasers, and more particularly semiconductor lasers and most particularly Vertical Cavity Surface Emitting Lasers (VCSELs), so as to cause these conditioned lasers to permanently emit laser light in an operationally-selected, or in a permanently-selected, one of but a few high-order circularly-symmetric Laguerre-Gaussian modes.

The conditioning of lasers of the semiconductor type is by process of "current annealing"—being a momentary operation of a laser with an alternating current drive exceeding at least in part the rated bias current drive capacity of the laser—so as to permanently alter the matrix of the lasing cavity, up to and including completely "burning out" the axially central region of the cavity. The lasing cavity, and laser, will thereafter permanently emit laser light in but (i) an operational-drivecurrent-selected circularly-symmetric high-order Laguerre-Gaussian mode, or even exclusively forever in but (ii) one single circularly-symmetric high-order Laguerre-Gaussian mode (regardless of drive current).

Effectively, a laser normally operational in some low order Hermite-Gaussian mode is permanently converted to be operational only in a high-order Laguerre-Gaussian mode (which high-order mode is, as are all Laguerre-Gaussian modes, circularly symmetric).

For all semiconductor and VCSEL lasers known to the inventors, the "current annealing" has no appreciable affect on laser power, frequency, efficiency, reliability, etc. All that transpires is that the typically-low-order typically-Hermite-Gaussian modes (which are asymmetric) and, more rarely, the low-order Laguerre-Gaussian operation modes (which are circularly symmetric), that are typical of the output phase and power distribution of all lasers are suppressed or are completely eliminated, and after the "current annealing" the laser will permanently operate to produce radiation only in a circularly-symmetric Laguerre-Gaussian distribution of order 2 or more, and more typically (as is determined by the process, and by the laser) of an order of, typically, approximately four (≈4).

The concept of the related invention and application—that the central axial region of a lasing cavity should be rendered inoperative for lasing in order to force operation of the laser in a high-order circularly-symmetric Laguerre-Gaussian mode—can be extended from semiconductor lasers to lasers of other types, most notably gas lasers. In the case of a gas laser the center of the lasing cavity is simply obstructed, or, alternatively equivalently, plugged. Lasing transpires only at radially peripheral regions of the lasing cavity, and produces a Laguerre-Gaussian energy distribution laser beam.

In accordance with the present invention, a laser producing a beam having a high-order circularly-symmetric Laguerre-Gaussian energy distribution, preferably (but not exclusively) a VCSEL, is strongly preferred for use in optical traps and tweezers. A table showing the measurement of the trapping force on a 10 μm sphere as a function of the driving current of a VCSEL conditioned to produce a Laguerre-Gaussian mode beam is shown in FIG. 13. The reason for the preference is obvious.

Figure 14:
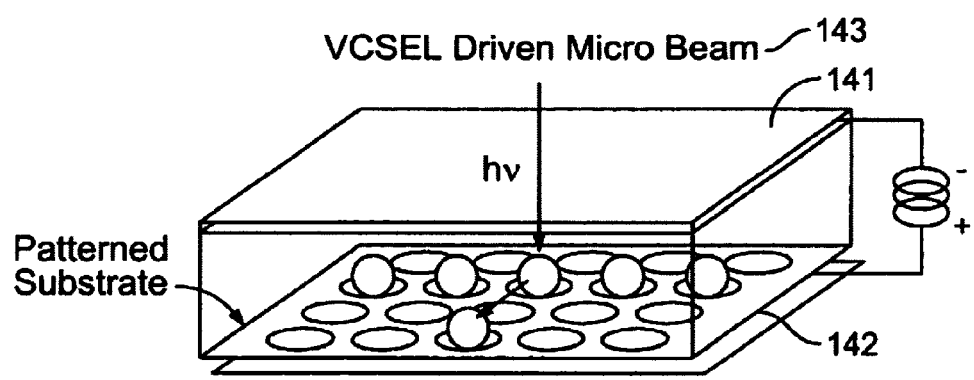
FIG. 14 illustrates one example of an apparatus for using VCSEL driven micro beams to manipulate objects in combination with electrical field forces.
Figure 14:
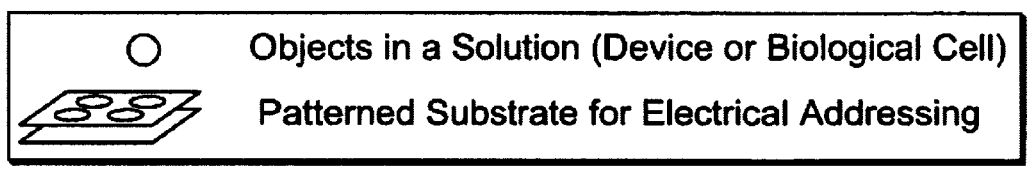

5. Pre-Positioning and Positioning Objects to be/also Optically Manipulated by Electrical Field Forces Objects suitably manipulated by VCSEL-originated and VCSEL-driven microbeams in accordance with the present invention are often also suitably pre-positioned, and/or positioned. and/or re-positioned by electrical field forces. An apparatus for so doing is shown in FIG. 14.

One or more objects to be manipulated are contained, normally in a liquid solution, between electrode plates 141,142, at least one of which plates (plate 141) through which (preferably) a VCSEL-driven micro beam 143 is passed being transparent to his micro-beam 143. Either substrate, and most normally the substrate 142, may be patterned, as illustrated, to facilitate placement, and retention in position, of objects variously moved by both electrical force, as is produced between the electrodes 141,142 and optical force, as is produced by the VCSEL-driven micro beam 143.

6. Summary

In summary, one or more vertical cavity surface emitting lasers (VCSELs) are used in optical tweezers apparatus in accordance with the present invention, including in the form of arrayed VCSELs as serve to produce multiple arrayed micro beams suitable for the simultaneous optical tweezing of multiple objects. Simultaneous transport of multiple micro spheres and other objects, normally in a one- or a two-dimensional array pattern, was demonstrated on a glass substrate. Manipulation and transport of objects is selective in accordance that an associated VCSEL-originated microbeam is turned "ON" or "OFF". The strength of the optical forces produced on each, and on every, manipulated object may be independently determined by the simple expedient of varying the drive current of the VCSEL producing the associated micro-beam. Likewise, any one or ones of multiple micro-beams impinging upon single manipulated object may be individually selectively controllably varied in order to, by way of example, rotate or spin the object.

The same optical tweezers of the present invention were used to successfully manipulate live biological cells. Optical tweezers in accordance with the present invention are very compact, and serve to provide efficient, effective and selective manipulation of multiple objects in arrays.

In accordance with the preceding explanation, variations and adaptations of the optical tweezers and optical tweezing methods in accordance with the present invention will suggest themselves to a practitioner of the optical trapping and tweezing arts. For example, and as is taught in the patent application for realizing Laguerre-Gaussian mode laser beams, such a Laguerre-Gaussian beam need not invariably be derived from a VCSEL, nor exclusively at the relatively low powers appropriate for the trapping and tweezing of small and microscopic objects. Larger objects could be manipulated by optical forces. The present invention thus shows that all optical traps and tweezers—and not just those of the present invention that are based on one or more VCSELs, nor those operating in parallel upon multiple objects—would benefit from lasers improved to emit Laguerre-Gaussian mode laser beams.

In accordance with these and other possible variations and adaptations of the present invention, the scope of the invention should be determined in accordance with the following claims, only, and not solely in accordance with that embodiment within which the invention has been taught.

What is claimed is:

1. Optical tweezers using laser light comprising:
at least one Vertical Cavity Surface Emitting Laser, or VCSEL, supplying the laser light.

2. The optical tweezers according to claim 1 wherein the at least one VCSEL comprises:
an array of VCSELs.

3. The optical tweezers according to claim 2
wherein a plurality of the VCSELs of the array simultaneously illuminate a plurality of objects at a plurality of different locations all at the same time.

4. The optical tweezers according to claim 2
wherein a plurality of the VCSELs of the array simultaneously illuminating a single object so as to increase an optical force imparted to the object over that optical force which would be imparted by a illumination with laser light from a single VCSEL.

5. The optical tweezers according to claim 1 or claim 2 or claim 3 further comprising:
a stage (i) supporting the at least one object that is being illuminated by the laser light of the at least one VCSEL, and (ii) moving relative to the laser light of this at least one VCSEL;
therein serving to spatially move the at least object that is illuminated by the laser light of the at least one VCSEL.

6. The optical tweezers according to claim 1 or claim 2 or claim 3 further comprising:
a source of an electric field for spatially positioning by electrical force a same object that is illuminated by laser light from the at least one VCSEL so as to exert optical force upon this object.

7. The optical tweezers according to claim 1 or claim 2 or claim 3
wherein the at least one VCSEL emits laser light having a Laguerre-Gaussian energy distribution.

8. The optical tweezers according to claim 1 or claim 2 or claim 3 capable of manipulating an object greater than 5 μm in size.

9. A method of optically trapping and tweezing comprising:
optically spatially manipulating at least one object illuminated by laser light of a vertical cavity surface emitting laser, or VCSEL.

10. The method of optically trapping and tweezing according to claim 9
wherein the optically spatially manipulating is applied to a plurality of objects illuminated by the laser light
beams of a plurality of vertical cavity surface emitting lasers, or VCSELs.

11. The method of optically trapping and tweezing according to claim 10
wherein the optically spatially manipulating is of all the trapped plurality objects simultaneously.

12. The method of optically trapping and tweezing according to claim 10
wherein the optically spatially manipulating of the trapped plurality objects is selective, with some of the plurality of objects being manipulated while others of the plurality of objects are not manipulated at all.

13. The method of optically trapping and tweezing according to claim 9 or claim 10 further comprising:
spatially moving at least one VCSEL relative to an object that is being illuminated by the laser light of this at least one VCSEL, therein spatially moving the object.

14. The method of optically trapping and tweezing according to claim 9 or claim 10 further comprising:

spatially positioning under force of an electric field the at least one object that is also optically spatially manipulated.

15. The method of optically trapping and tweezing according to claim 9 or claim 10 wherein the optically spatially manipulating by the laser light of a VCSEL is with laser light that is Laguerre-Gaussian in its power distribution.

16. The method of optically trapping and tweezing according to claim 9 or claim 10 wherein the optically spatially manipulating is of at least one object greater than 5 µm in size.

17. Optical tweezers comprising:

a stage supporting a plurality of optically manipulatable objects; and a plurality of Vertical Cavity Surface Emitting Lasers, or VCSELs, respectively originating a plurality of laser light beams for concurrently optically manipulating the plurality of objects supported upon the stage.

18. The optical tweezers according to claim 17 wherein the stage supporting the plurality of objects moves spatially relative to the plurality of laser light beams, therein simultaneously moving the plurality of objects.

19. The optical tweezers according to claim 17 further comprising:

a source of an electric field for electrically manipulating the plurality of objects supported upon the stage.

20. An optical tweezer, comprising:

a stage holding an object; and multiple Vertical Cavity Surface Emitting Lasers, or VCSELs, to respectively produce multiple laser beams impinging upon the object at the same time, therein enhancing the optical force imparted to the object over that which would be imparted by a single laser beam.

21. The optical tweezer according to claim 20 wherein the multiple VCSELs are organized in a regular geometric array.

22. Optical tweezers comprising:

a stage holding multiple objects; and a source of multiple intensity-controllable laser beams illuminating the multiple objects; and a controller of the intensities of the laser beams;

wherein an optical force imparted to each of the multiple object illuminated by the multiple laser beams may be varied in accordance that the intensity of a corresponding one of the multiple laser beams is varied, wherein the source of the multiple intensity-controllable laser beams comprises:

multiple VCSELs independently controllable in drive current; and wherein the controller of the intensities of the laser berms comprises;

a controller of the drive currents of the multiple VCSELs so as to produce the multiple laser beams at multiple intensities.

23. The optical tweezers according to claim 22 wherein the multiple drive-current-controllable VCSELs are organized in a regular geometric array.

24. Optical tweezers comprising:

two electrodes, at least one of which is optically transparent, holding between them at least one object suitably manipulatable both by (i) an electric field between the two electrodes and, also, (ii) an impinging laser light beam; and a Vertical Cavity Surface Emitting Laser, or VCSEL, to produce a laser beam passing through the at least one electrode that is transparent to impinge upon the at least one object so as to optically manipulate this at least one object, wherein the at least one object is susceptible of manipulation by both electrical and optical forces.

25. The optical tweezers according to claim 24 further comprising:

a liquid solution between the two electrodes in which liquid solution the at least one object is maintained.

26. An optical tweezer, comprising:

a Vertical Cavity Surface Emitting Laser, or VCSEL, to produce laser light with a Laguerre-Gaussian energy distribution.

27. The optical tweezer as in claim 26, further comprising electrodes to apply an electric field to electrically manipulate an object that is optically manipulated by the laser light.

28. The optical tweezer as in claim 26, further comprising:

a lens to collect light from an object optically manipulated by the laser light; and a camera to capture light from the lens to form an image of the object being optically manipulated by the laser light.

29. The optical tweezer as in claim 28, further comprising:

a stage to hold the object and at least another object; and means for moving the stage to move the other object into the laser light to be optically manipulated.

30. The optical tweezers as in claim 24, wherein each VCSEL emits laser light having a Laguerre-Gaussian energy distribution.

31. The optical tweezer as in claim 20, wherein each VCSEL has a Laguerre-Gaussian energy distribution.

32. The optical tweezers as in claim 22, wherein each VCSEL emits laser light having a Laguerre-Gaussian energy distribution.

33. The optical tweezers as in claim 24, wherein the VCSEL emits laser light having a Laguerre-Gaussian energy distribution.

* * * * *